United States Patent
Brown

(10) Patent No.: US 11,358,224 B2
(45) Date of Patent: Jun. 14, 2022

(54) MODULE FOR ADDITIVE MANUFACTURING APPARATUS AND METHOD

(71) Applicant: RENISHAW PLC, Wotton-under-Edge (GB)

(72) Inventor: Ceri Brown, Redland (GB)

(73) Assignee: RENISHAW PLC, Wotton-under-Edge (GB)

( * ) Notice: Subject to any disclaimer, the term of this patent is extended or adjusted under 35 U.S.C. 154(b) by 947 days.

(21) Appl. No.: 15/775,440

(22) PCT Filed: Nov. 14, 2016

(86) PCT No.: PCT/GB2016/053561
§ 371 (c)(1),
(2) Date: May 11, 2018

(87) PCT Pub. No.: WO2017/085470
PCT Pub. Date: May 26, 2017

(65) Prior Publication Data
US 2018/0326485 A1 Nov. 15, 2018

(30) Foreign Application Priority Data

Nov. 16, 2015 (IN) .............................. 3730/DEL/2015
Jan. 5, 2016 (GB) ...................................... 1600122
(Continued)

(51) Int. Cl.
*B22F 12/00* (2021.01)
*B29C 64/135* (2017.01)
(Continued)

(52) U.S. Cl.
CPC ............ *B22F 12/00* (2021.01); *B23K 26/032* (2013.01); *B23K 26/0604* (2013.01);
(Continued)

(58) Field of Classification Search
CPC .......... B22F 10/10; B22F 10/20; B22F 12/00; B23K 26/032; B23K 26/0604;
(Continued)

(56) References Cited

U.S. PATENT DOCUMENTS 4,838,631 A 6/1989 Chande et al.
4,997,250 A 3/1991 Ortiz, Jr.
(Continued)

FOREIGN PATENT DOCUMENTS

CN 102266942 A 12/2011
CN 202291409 U 7/2012
(Continued)

OTHER PUBLICATIONS

Aug. 6, 2020 Office Action issued in U.S. Appl. No. 15/810,621.
(Continued)

*Primary Examiner* — Dana Ross
*Assistant Examiner* — James F Sims, III
(74) *Attorney, Agent, or Firm* — Oliff PLC

(57) ABSTRACT

A module for an additive manufacturing apparatus including more than one optical train, each optical train providing a route for a laser beam to pass through the module and including steering optics for steering the laser beam towards the material to be consolidated as part of a layer-by-layer additive manufacturing process. The module is configured to deliver laser beams from the more than one optical trains through a single window in a build chamber of the additive manufacturing apparatus.

21 Claims, 11 Drawing Sheets

(30) Foreign Application Priority Data

| Mar. 14, 2016 | (GB) | ..................................... | 1604298 |
| Mar. 21, 2016 | (GB) | ..................................... | 1604728 |
| Apr. 25, 2016 | (GB) | ..................................... | 1607152 |

(51) Int. Cl.

| B29C 64/153 | (2017.01) |
| B29C 64/286 | (2017.01) |
| B29C 64/371 | (2017.01) |
| B23K 26/03 | (2006.01) |
| B23K 26/06 | (2014.01) |
| B23K 26/12 | (2014.01) |
| B23K 26/14 | (2014.01) |
| B23K 26/342 | (2014.01) |
| B23K 26/082 | (2014.01) |
| B33Y 10/00 | (2015.01) |
| B33Y 30/00 | (2015.01) |
| B33Y 40/00 | (2020.01) |
| B22F 10/10 | (2021.01) |

(52) U.S. Cl.

CPC .......... B23K 26/082 (2015.10); B23K 26/127 (2013.01); B23K 26/14 (2013.01); B23K 26/1464 (2013.01); B23K 26/342 (2015.10); B29C 64/135 (2017.08); B29C 64/153 (2017.08); B29C 64/286 (2017.08); B29C 64/371 (2017.08); B22F 10/10 (2021.01); B33Y 10/00 (2014.12); B33Y 30/00 (2014.12); B33Y 40/00 (2014.12); Y02P 10/25 (2015.11)

(58) Field of Classification Search

CPC .... B23K 26/082; B23K 26/127; B23K 26/14; B23K 26/1464; B23K 26/342; B29C 64/135; B29C 64/153; B29C 64/286; B29C 64/371; B33Y 10/00; B33Y 30/00; B33Y 40/00; Y02P 10/25

USPC ...................................................... 219/121.6

See application file for complete search history.

(56) References Cited

U.S. PATENT DOCUMENTS

| 5,231,261 | A | 7/1993 | Duthoo |
| 5,267,013 | A | 11/1993 | Spence |
| 5,508,489 | A | 4/1996 | Benda et al. |
| 5,536,467 | A | 7/1996 | Reichle et al. |
| 5,832,415 | A | 11/1998 | Wilkening et al. |
| 5,846,370 | A | 12/1998 | O'Connor |
| 5,985,204 | A | 11/1999 | Otsuka et al. |
| 6,091,749 | A | 7/2000 | Hoffmaster et al. |
| 6,122,564 | A | 9/2000 | Koch et al. |
| 6,126,884 | A | 10/2000 | Kerekes et al. |
| 6,325,961 | B1 | 12/2001 | Beers et al. |
| 6,384,370 | B1 | 5/2002 | Tsunemi et al. |
| 6,459,951 | B1 | 10/2002 | Griffith et al. |
| 6,483,596 | B1 | 11/2002 | Philippi et al. |
| 6,492,651 | B2 | 12/2002 | Kerekes |
| 6,580,959 | B1 | 6/2003 | Mazumder |
| 6,624,386 | B2 | 9/2003 | Von Borstel |
| 6,767,499 | B1 | 7/2004 | Hory et al. |
| 6,791,057 | B1 | 9/2004 | Kratzsch et al. |
| 6,815,636 | B2 | 11/2004 | Chung et al. |
| 7,168,935 | B1 | 1/2007 | Taminger et al. |
| 7,261,550 | B2 | 8/2007 | Herzog |
| 7,419,632 | B2 | 9/2008 | Keller |
| 7,515,986 | B2 | 4/2009 | Huskamp |
| 7,537,722 | B2 | 5/2009 | Andersson et al. |
| 7,714,250 | B2 | 5/2010 | Borgoltz et al. |
| 7,863,544 | B2 | 1/2011 | Serruys et al. |
| 8,395,783 | B2 | 3/2013 | Donaher et al. |
| 2001/0014403 | A1 | 8/2001 | Brown et al. |
| 2002/0090313 | A1 | 7/2002 | Wang et al. |
| 2003/0005107 | A1 | 1/2003 | Dulberg et al. |
| 2003/0052105 | A1 | 3/2003 | Nagano et al. |
| 2004/0173946 | A1 | 9/2004 | Pfeifer et al. |
| 2005/0002434 | A1 | 1/2005 | Armier et al. |
| 2005/0107773 | A1 | 5/2005 | Bergt et al. |
| 2005/0252895 | A1 | 11/2005 | Schuermann et al. |
| 2005/0263934 | A1 | 12/2005 | Chung et al. |
| 2006/0118532 | A1* | 6/2006 | Chung ................ B22F 3/1028 219/121.85 |
| 2007/0145629 | A1 | 6/2007 | Ebert et al. |
| 2007/0176312 | A1 | 8/2007 | Clark et al. |
| 2007/0183918 | A1 | 8/2007 | Monsheimer et al. |
| 2008/0025734 | A1 | 1/2008 | Kehoe et al. |
| 2008/0124433 | A1 | 5/2008 | Yelden et al. |
| 2008/0151341 | A1 | 6/2008 | Perret et al. |
| 2009/0097511 | A1 | 4/2009 | Mohrdiek et al. |
| 2009/0152771 | A1 | 6/2009 | Philippi et al. |
| 2009/0206065 | A1 | 8/2009 | Kruth et al. |
| 2009/0206522 | A1 | 8/2009 | Hein et al. |
| 2011/0039016 | A1 | 2/2011 | Beard |
| 2011/0121492 | A1 | 5/2011 | Philippi et al. |
| 2011/0259862 | A1* | 10/2011 | Scott ..................... B29C 64/268 219/121.73 |
| 2013/0112672 | A1 | 5/2013 | Keremes et al. |
| 2013/0168902 | A1 | 7/2013 | Herzog et al. |
| 2013/0199748 | A1 | 8/2013 | Christensen et al. |
| 2013/0316081 | A1 | 11/2013 | Kovalcik et al. |
| 2015/0375456 | A1 | 12/2015 | Cheverton et al. |
| 2016/0082668 | A1 | 3/2016 | Perret et al. |
| 2016/0279707 | A1* | 9/2016 | Mattes .................... B29C 64/25 |

FOREIGN PATENT DOCUMENTS

| CN | 203791625 U | 8/2014 |
| CN | 105834422 B | 9/2018 |
| DE | 4112695 A1 | 7/1992 |
| DE | 19953000 A1 | 5/2001 |
| DE | 10236907 A1 | 2/2004 |
| DE | 102004057865 A1 | 6/2006 |
| DE | 102005014483 A1 | 10/2006 |
| EA | 007448 B1 | 10/2006 |
| EP | 2147738 A1 | 1/2010 |
| EP | 2186625 A2 | 5/2010 |
| EP | 2 832 475 A2 | 2/2015 |
| GB | 2342609 A | 4/2000 |
| JP | 6273682 A | 9/1994 |
| JP | H11-198235 A | 7/1999 |
| JP | 2002-011584 A | 1/2002 |
| JP | 2002/144437 A | 5/2002 |
| JP | 2003/015071 A | 1/2003 |
| JP | 2004-082116 A | 3/2004 |
| JP | 2004/195491 A | 7/2004 |
| JP | 2005/024835 A | 1/2005 |
| JP | 2005-334924 A | 12/2005 |
| JP | 2006/078903 A | 3/2006 |
| JP | 2008/015003 A | 1/2008 |
| JP | 2008-155538 A | 7/2008 |
| JP | 2009/006509 A | 1/2009 |
| JP | 4760830 B2 | 8/2011 |
| JP | 2017/501052 A | 1/2017 |
| JP | 6422910 B2 | 11/2018 |
| NL | 2013865 B1 | 10/2016 |
| WO | 94/15265 A1 | 7/1994 |
| WO | 2007/007379 A1 | 1/2007 |
| WO | 2007/147221 A1 | 12/2007 |
| WO | 2010/007396 A1 | 1/2010 |
| WO | 2010/026397 A1 | 3/2010 |
| WO | 2012/097799 A2 | 7/2012 |
| WO | 2012/100766 A1 | 8/2012 |
| WO | 2013/029581 A1 | 3/2013 |
| WO | 2013/037346 A1 | 3/2013 |
| WO | 2013/098054 A1 | 7/2013 |
| WO | 2014/180971 A1 | 11/2014 |
| WO | 2014/199134 A1 | 12/2014 |
| WO | 2014/199149 A1 | 12/2014 |
| WO | 2015/083104 A1 | 6/2015 |
| WO | 2015/091485 A1 | 6/2015 |

(56) References Cited

FOREIGN PATENT DOCUMENTS

| WO | 2015/092442 A1 | 6/2015 |
| WO | 2015/195909 A1 | 12/2015 |
| WO | 2016/022336 A2 | 2/2016 |

OTHER PUBLICATIONS

Feb. 24, 2017 International Search Report issued in International Patent Application No. PCT/GB2016/053561.
Feb. 24, 2017 Written Opinion issued in International Patent Application No. PCT/GB2016/053561.
Feb. 24, 2016 Search Report issued in British Patent Application No. 1600122.4.
Oct. 18, 2016 Search Report issued in British Patent Application No. 1604728.4.
Nov. 11, 2016 Search Report issued in British Patent Application No. 1607152.4.
Jan. 26, 2017 Office Action issued in U.S. Appl. No. 14/832,395.
Aug. 7, 2017 Notice of Allowance issued in U.S. Appl. No. 14/832,395.
IB, International Search Report, PCT/GB2009/002147.
GB, Patent Office Search Report, GB0816308.1, dated Jan. 22, 2009.
EP 2342042, Office Action dated Apr. 30, 2013 (5 pages).
Nicolaj C. Stache, Henrik Zimmer Jens Gedicke, Bortis Regaard, Alexander Olowinsky, Achim Knepper, and Til Aach—"Approaches for High-Speed Melt Pool Detection in Laser Welding Applications"—Europe—Nov. 22-24, 2006.
S. Kaierie, P. Abels, C. Kratzsch—"Process Monitoring and Control for Laser Materials Processing"—German—Jun. 2005.
Fabrice Bardin, Adolfo Cobo, Jose Lopez-Higuera, Olivier Collin, Ascal Aubry, Thierry Dubois, Mats Hogstrom, Per Nylen, Peter Jonsson, Julian D.C. Jones, and Duncan P. Hand—2006 Optical Society of America—"Optical Techniques for Real-Time Penetration Monitoring for Laser Welding." *The year of publication is sufficiently earlier than the effective US filing date and any foreign priority date so that the particular month of publication is not at issue.*
Guijun Bi, Bert Schurmann, Andres Gasser, Konrad Wissenbach, Reinhart Poprawe—International Journal of Machine Tools & Manufacture—2007—"Development and Qualification of a Novel Laser-Cladding Head With Intergrated Sensors" *The year of publication is sufficiently earlier than the effective US filing date and any foreign priority date so that the particular month of publication is not at issue.*
Dongming Hu, Radovan Kovacevic—International Journal of Medicine Tools & Manufacture—2003—"Sensing Modeling and Control for Laser-Based Additive Manufacturing" *The year of publication is sufficiently earlier than the effective US filing date and any foreign priority date so that the particular month of publication is not at issue.*
Peter Abels, Stefan Kaierle, Christian Kratzsch, Reinhart Poprawe and Wolfgang Schultz—Conference Paper for U.S. Proceedings—1999—"Universal Coaxial Process Control System for Laser Materials Processing" *The year of publication is sufficiently earlier than the effective US filing date and any foreign priority date so that the particular month of publication is not at issue.*
May 9, 2014 Office Action Issued in European Patent Office in Application No. 09 785 069.7-1702.
Weslake, Daniel; Canadian Requisition by the Examiner, 11 pages; CA Application No. 2,738,619; dated Aug. 23, 2016.
Aug. 28, 2017 Corrected Notice of Allowance issued in U.S. Appl. No. 14/832,395.
May 22, 2018 Search Report issued in European Application No. 17194598.3.
Feb. 13, 2018 Search Report issued in European Application No. 17194598.3.
Feb. 17, 2021 Notice of Allowance issued in U.S. Appl. No. 15/810,621.

* cited by examiner

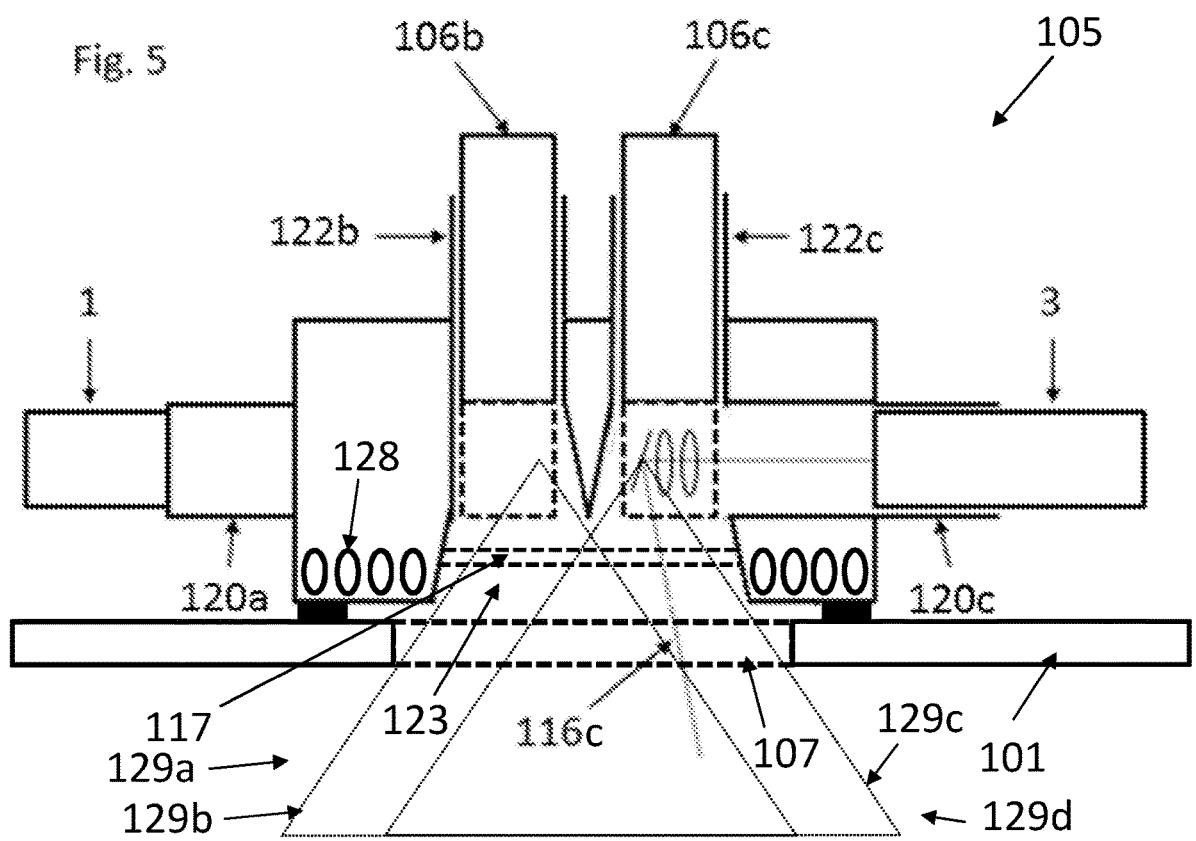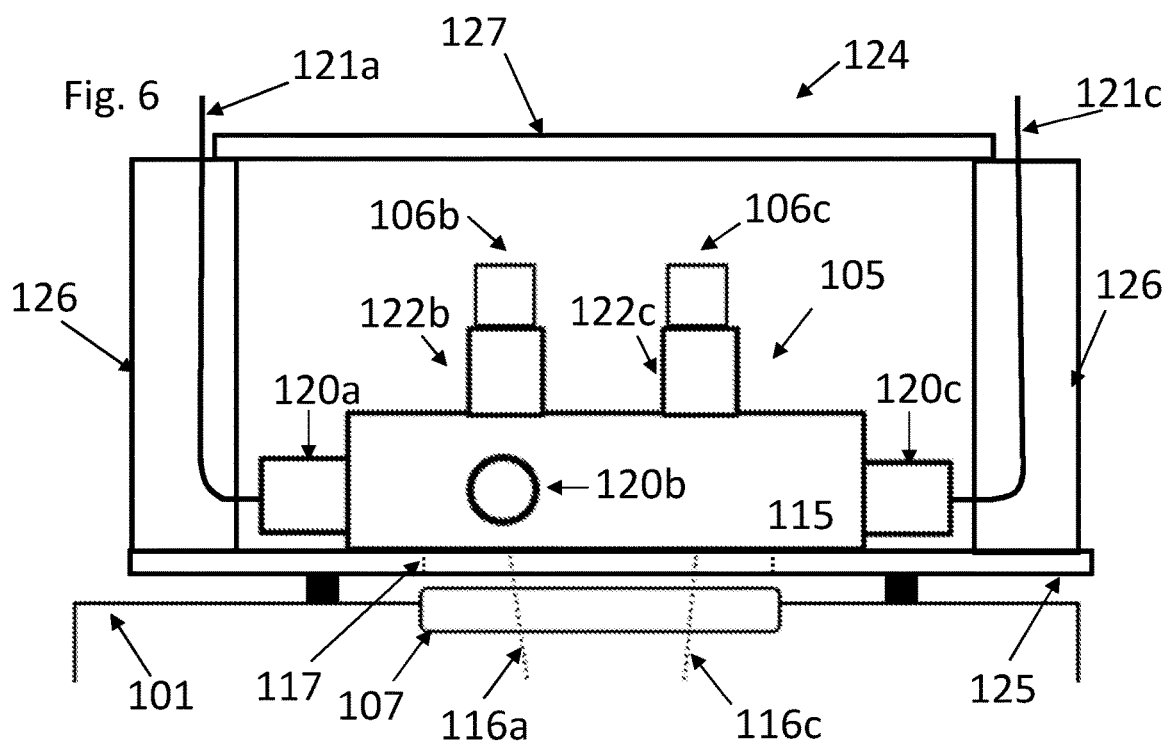

MODULE FOR ADDITIVE MANUFACTURING APPARATUS AND METHOD

The present invention relates to a module for an additive manufacturing apparatus and, in particular to a module comprising a plurality of optical trains for use in forming objects in a layer-by-layer manner.

Additive manufacturing or rapid prototyping methods for producing objects comprise layer-by-layer solidification of a material, such as a metal powder material, using a laser beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required.

It is known from DE 102005014483 to use four laser beams, each laser beam solidifying powder in a different quadrant of the powder bed. Such an arrangement may increase build speed because different parts of an object or different objects located in different quadrants can be built simultaneously with different laser beams. Four f-theta lenses are provided as window units located in the upper wall of the process chamber housing.

WO 2014/199134 discloses an arrangement having four lasers each associated with one of four optical modules that are physically spaced apart. The scanning zones for each laser overlap but are not coterminous with regions of the powder bed to which one but not all laser beams can be directed and a central region to which all four laser beams can be directed. Performance of a scanner tends to vary for different positions of the laser beam. For example, if the scanner comprises rotatable mirrors, an accuracy of the mirrors may vary dependent on angle. Furthermore, as the spot is moved away from a position in which the laser beam is perpendicular to the powder bed, the spot will become more elliptical. As the optics for individually steering each laser beam have to be physically spaced apart, a scanning zone over which a particular performance is achieved for each laser beam is likely not to coincide with the corresponding scanning zone for the other laser beams. By arranging the scanner such that each scanning zone is less than the total area of the powder bed, areas in which the scanner can direct a laser beam with a particular performance that do not overlap with corresponding areas for the other laser beams may be utilised whilst flexibility is retained for scanning areas of the powder bed that do fall within overlapping areas.

WO 2010/026397 suggests an optical module could comprise two or more optical trains (the arrangement within the module that the laser light passes through). Thus, the module may be able to deliver two or more laser beams into a processing chamber simultaneously. The document discloses the optical module having exit apertures for an optical train and a window in a build chamber being substantially the size of an f-theta lens of the optical train.

During a build the position to which a laser beam is steered can drift from the desired/commanded position due to temperature changes in the module. In apparatus with a plurality of optical trains for steering a plurality of laser beams, differential thermal drift can occur between two optical trains due to differences in temperature between the optical trains. This can result in adjacent solidified sections of the build, melted by different laser beams, not being aligned as desired.

According to a first aspect there is provided a module for an additive manufacturing apparatus comprising more than one optical train, each optical train providing a route for a laser beam to pass through the module and comprising steering optics for steering the laser beam towards the material to be consolidated as part of a layer-by-layer additive manufacturing process;

wherein the module is configured to deliver laser beams from the more than one optical trains through a single window in a build chamber of the additive manufacturing apparatus.

The module may comprise a fixing point or points for attaching the module to the build chamber of the additive manufacturing apparatus so the module bridges the build chamber window.

The module may comprise a single aperture common to the more than one optical train.

The module may comprise a common thermal circuit thermally connecting each of the more than one optical trains.

The common thermal circuit may be a cooling circuit comprising cooling channels.

The cooling circuit may cool the module in the vicinity of the single aperture common to the more than one optical trains.

The module may comprise an additively built housing.

The module may comprise a unitary and/or common and/or integrated and/or integral and/or one-piece and/or single and/or shared and/or interconnected and/or coincident housing.

Each optical train may have an associated irradiation volume. Each irradiation volume may overlap with one or more other radiation volumes thereby defining an irradiation volume overlap.

The module may provide an irradiation volume overlap which contains, in use at least part of the window in the build chamber. The irradiation volume overlap may contain at least part of the window of the module.

According to a second aspect there is provided a module for an additive manufacturing apparatus in which material is consolidated as part of a layer-by-layer additive manufacturing process;

comprising more than one optical train, each optical train providing a route for a laser beam to pass through the module and be directed towards the material to be consolidated;

wherein the more than one optical trains are provided within a single piece housing.

The housing may be an additively built housing.

According to a third aspect there is provided an additive manufacturing apparatus comprising the module of the first or second aspects.

The additive manufacturing apparatus may comprise a plurality of modules according to the first or second aspect arranged as an array. The array may be a one-dimensional array. The plurality of modules of the array may be elongate modules and arranged together along a minor axis.

The array may be a two-dimensional array. The two-dimensional array may comprise more than two modules in a first direction and may comprise more than two modules in a second direction, the first and second directions may be orthogonal.

The additive manufacturing apparatus may comprise a build chamber, the module may be attached to the build chamber, the module may be able to direct at least one laser beam to a working plane wherein each laser beam defines a scanning zone on the working plane.

The additive manufacturing apparatus may comprise a module arranged such that a footprint of the module on a build chamber is not greater than the area which may be irradiated by the module on a working plane.

According to a fourth aspect there is provided an additive manufacturing apparatus for building an object in a layer-by-layer additive process comprising an array of modules, at least one module comprising more than one optical train, each optical train providing a route for a laser beam to pass through the module and comprising steering optics for steering the laser beam towards the material to be consolidated, wherein the array is a two dimensional array and comprises more than two modules in a first direction and more than two modules in a second direction, the first and second directions being orthogonal directions and wherein the array is arranged in the additive manufacturing apparatus so as to provide a continuous scannable area.

The modules of the array may be spaced such that at least part of the scannable area on the working plane may be scanned by lasers from both a first module and a second module.

According to a fifth aspect there is provided a method of manufacturing the module of the first or second aspects comprising forming at least part of the module by layer-by-layer additive consolidation of material.

In order that the invention be better understood, it will now be described, by way of example only, with reference to the accompanying drawings, in which:

FIG. 1 is a schematic view of a laser solidification apparatus according to an embodiment;

FIG. 2 is a schematic view of the laser solidification apparatus of FIG. 1 from another side;

FIG. 3 shows a plan view of a housing for a module according to an embodiment of the invention;

FIG. 4 shows a side view of the housing for the module of FIG. 3;

FIG. 5 shows a cross section of the module in use as viewed along the line V-V of the housing for the module of FIG. 3;

FIG. 6 shows an alternative embodiment of a module according to the invention;

FIG. 7 shows a plan view of a further embodiment of a housing for a module according to the invention;

FIG. 8 shows a plan view of yet a further embodiment of a housing for a module according to the invention mounted to a build chamber of an additive manufacturing apparatus;

FIG. 9a shows a plan view of the embodiment of FIG. 8 mounted to a build chamber of an additive manufacturing apparatus;

FIG. 9b shows scanning zones produced by the module of FIG. 9a on a working plane of the additive manufacturing apparatus;

FIG. 10a shows an array of optical modules located within an additive manufacturing apparatus;

FIG. 10b shows an optical module comprising an image capture device.

FIG. 10c shows scanning zones produced by the array of FIG. 10a on a working plane of the additive manufacturing apparatus;

FIG. 11 shows a further embodiment of a module according to the invention;

FIG. 12a shows a plan view of a further alternative embodiment of a module according to the invention;

FIG. 12b shows a plurality of modules of FIG. 12a arranged in a 2-dimensional array within an additive manufacturing apparatus;

FIG. 12c shows scanning zones produced by the array of FIG. 12b on a working plane of the additive manufacturing apparatus.

Referring to FIGS. 1 and 2, a laser solidification apparatus comprising an optical module 105 according to an embodiment of the invention further comprises a build platform 102 for supporting an object 103 built by selective laser melting powder 104. The platform 102 can be lowered in the chamber 101 as successive layers of the object 103 are formed. Layers of powder 104 are formed as the object 103 is built by dispensing apparatus 108 and a wiper 109. For example, the dispensing apparatus 109 may be apparatus as described in WO 2010/007396. Four lasers 1, 2, 3 and 4 such as Nd:YAG or fibre laser each generate a laser beam for melting the powder 104. Each laser beam is directed as required by optical module 105 and beam director modules 106 under the control of a computer 130. The laser beams enter the build chamber 101 via a window 107. Each laser beam can be independently steered to solidify separate areas of the powder bed 104.

An inlet 112 and outlet 110 are arranged for generating a gas flow across the powder bed formed on the build platform 102. The inlet 112 and outlet 110 are arranged to produce a laminar flow having a flow direction from the inlet to the outlet, as indicated by arrows 118. Gas is re-circulated from the outlet 110 to the inlet 112 through a gas recirculation loop 111. A pump 113 maintains the desired gas flow at inlet 112. A filter 114 is provided in the recirculation loop 111 to filter condensate and other particles that have become entrapped in the flow. It will be understood that more than one inlet 112 may be provided in the build chamber 101. Furthermore, rather than extending outside of the build chamber 101, the recirculation loop 111 may be contained within the build chamber 101.

Computer 130 comprises a processor unit 131, memory 132, display 133, user input device 135, such as a keyboard, touch screen, etc., a data connection to modules of the laser sintering unit, such as optical module 105, beam director modules 106 and laser modules 1 to 4, and an external data connection 135. Stored on memory 132 is a computer program that instructs the processing unit 131 to carry out build methods.

FIGS. 3 and 4 show a housing for an optical module and FIG. 5 shows an optical module 105 in more detail. Optical module 105 has a housing comprising a main body 115, and four laser beam receiver portions 120a, 120b, 120c, 120d for coupling to a laser beam source 1, 2, 3, 4 and beam director module receiver portions 122a, 122b, 122c, 122d. It will be appreciated that while four laser beam receiver portions 120 and four beam director module receiver portions 122 are shown this need not be the case and in other embodiments of the optical module 105 fewer (for example two or three) or more (for example five, six, seven, eight or more) laser beam receiver portions 120 and beam director module receiver portions 122 may be provided. While the illustrated embodiment shows each laser beam receiver portion 120 adapted to receive a laser or laser module 1, 2, 3, 4 it will be appreciated that this need not be the case and a, some, many or each/all of the laser beam receiver portions 120 may be adapted to receive a laser beam in any other suitable way including a laser beam delivered by a fibre optic cable or a laser beam delivered through space/across a gap. In such cases each laser beam receiver portion 120 may receive a laser beam from a different laser or a single laser may produce a laser beam which is split into a plurality of laser beams, each one of the laser beams provided to a corresponding laser beam receiver portion 120. Further while the illustrated embodiment shows each laser beam receiver portion 120 has an associated beam director module receiver portion 122 this need not be the case and a single beam director module receiver portion 122 may be adapted to receive a beam director module 106 for directing more than one laser beam from one or more laser sources and in some embodiments there may be a single beam director module receiver portion 122 for receiving a beam director module 106 for directing all laser beams. In still further embodiments beam director optics may be built-in, i.e. not easily removable from the housing 115/optical module 105 and no beam director module receiver portions 122 need be provided.

FIG. 5 shows a cross section of optical module 105 taken along line V-V of the housing 115 of the module of FIG. 3 and shows lasers 1 and 3. FIG. 5 also shows two beam director modules 106b, 106c. A first beam director module 106c (on the right hand side of the figure) is shown associated with laser 3, i.e. a first beam director module 106c is received in the beam director module receiver portion 122c associated with the laser beam receiver portion 120c in which laser 3 is received. A second beam director module 106b (on the left hand side of the figure) is received in the beam director module receiver portion 122b associated with the laser beam receiver portion 120b in which FIG. 1 shows laser 2 being received. As is shown in FIG. 5 a laser 3 produces a laser beam 116c which is directed along a beam path defined by an optical train and which passes into beam director module 106 which directs the laser beam 116 out of the optical module 105 so as to pass into build chamber 101 through window 107 and reach a desired location on powder 104. Laser beam 116 is shown exiting optical module 105 through aperture 123 which in this embodiment is a single aperture 123 common to all optical trains provided by the optical module 105. In other embodiments of optical module 105, a common exit aperture may be provided for some but not all optical trains. It will be appreciated that the beam path may be controlled by beam director module 106 which forms part of the optical train. It will be appreciated that the optical module 105 of the current embodiment has four optical trains, each optical train being associated with a laser beam receiver portion 120a, 120b, 120c, 120d and beam director module receiver portion 122a, 122b, 122c, 122d. The beam director module 106c is schematically shown containing a pair of focusing lenses and a mirror however it will be understood that beam director module may contain any suitable arrangement of optical elements for directing the laser beam 116 onto the desired location within the build chamber. Preferably beam director module 106 comprises a pair of mirrors (e.g. Galvano driven mirrors) for directing the laser beam 116 in two dimensions over powder 104 within build chamber 101. Beam director module 106 may comprise any suitable arrangement of elements for focusing (including defocusing), reflective elements, refractive elements, diffractive elements or directing elements for directing, reflecting, refracting, diffracting, focusing or shaping the laser beam. Each beam director module 106 may contain the same arrangement for directing, reflecting, refracting, diffracting, focusing or shaping the laser beam however this need not be the case and each beam director module 106 may be adapted to direct, reflect, refract, diffract, focus or shape each laser beam in a different manner. The lower face (i.e. the face to be directed at window 107 of build chamber 101 in use) of optical module 105 can be seen to have an opening 123 through which laser beam(s) 116 may be directed. Within opening 123 a module window 117 may be provided. Module window 117 may serve to protect beam director modules 106 or other elements of/within the optical module 105 from contamination.

FIGS. 1, 2 and 5 show optical module 105 mounted within a selective laser solidification apparatus. The figures show optical module 105 extending beyond the edges of window 107, this allows optical module 105 to be fixed (i.e. held) in place in at a plurality of positions around window 107, in other embodiments the optical module 105 may be fixed in place by a single connection which extends at least partially around window 107 and may fully encircle the window 107 in other embodiments. By providing a single optical module 105 capable of receiving a plurality of laser beams to be steered into a build chamber 101 through window 107, physical and thermal connection between the parts of the optical module 105 which are associated with each optical train is achieved as well as establishing a positional relationship between each laser beam receiver portion 120.

FIG. 5 shows cooling channels 128 which in this embodiment are located proximal the lower face of optical module 105 (i.e. the face of the optical module 105 to be located facing the build chamber). The housing forming part of optical module 105 is built additively such that the housing is a single piece housing. The cooling channels 128 may form a common cooling circuit (i.e. a common thermal circuit) for maintaining a uniform temperature across the whole optical module 105 or for maintaining a uniform temperature over at least a volume proximal a lower face of the optical module 105 or for maintaining a uniform temperature over at least a volume proximal aperture 123 of the optical module 105. Cooling channels 128 allow part of the optical module 105 associated with a particular optical train to be thermally connected with the parts of the optical module 105 associated with other optical trains. In some embodiments cooling channels 128 and the common cooling circuit may not be provided, in such embodiments it will be understood a common thermal circuit between parts of the optical module 105 associated with different optical trains will still be provided by conduction of heat through the housing of optical module 105.

By providing thermal connection by conduction through the housing of the optical module 105 and optionally by the common cooling circuit which may be provided by cooling channels 128, heat transfer between parts of the optical module 105 associated with a particular optical trains can occur, in use across window 107, that is across the part of the optical module 105 located in the area above window 107 in build chamber 101 between a part of optical module 105 associated with a particular optical train and a part of the optical module 105 associated with a different optical train. Each optical train is directly thermally connected with at least one other optical train. FIGS. 1, 2 and 5 show optical module 105 attached to build chamber on either side of window 107. By providing thermal connection between optical trains of the optical module 105 a thermal bridge is provided across window 107 of build chamber 101.

FIG. 5 schematically shows irradiation volumes 129b, 129c. Irradiation volume 129c represents the trajectories along which laser beam 116c can be steered (either due to physical constraints which may be imposed by for example beam director module 106c and/or constraints imposed by control of the system by computer 130 which may be user defined). Irradiation volumes 129a, 129d are similar to irradiation volumes 129b, 129c and are located behind irradiation volumes 129b, 129c in FIG. 5. Irradiation volumes of the current embodiment are substantially polyhedral and may be substantially pentahedral, in other embodiments irradiation volumes 129 may be substantially conical. Similarly, irradiation volume 129b represents the trajectories along which laser beam 116b from a laser 2 (not shown in FIG. 5) could be steered. As shown irradiation volume 129b and irradiation volume 129c overlap to create a three dimensional overlap space herein referred to as an irradiation volume overlap. The irradiation volume overlap passes through a plane which is coincident with window 107 in build chamber 101 and the irradiation volume overlap extends across at least part of the window 107 at the level of said plane. Such overlap of irradiation volumes allows overlap of areas to which each laser beam can be directed on the powder bed. In the illustrated embodiment each irradiation volume 129a, 129b, 129c, 129d associated with each optical train overlaps with each other irradiation volume 129a, 129b, 129c, 129d, this however need not be the case. It will be appreciated that each beam director module 106 is controlled to steer laser beams 116 such that laser beams 116 do not interact in an undesired manner with one another in the irradiation volume overlap. As the window 107 extends into the irradiation volume overlap, splitting of the window into two or more separate windows is undesirable as the irradiation volumes would intersect the divider between any such separated windows. In use each irradiation volume 129a, 129b, 129c, 129d will define a scanning zone 119 (see FIG. 9b) on working a plane (i.e. a plane containing the powder bed to which an associated laser beam 116 may be directed).

In previous selective laser solidification devices such as that disclosed in WO 2014/199134, four laser modules have been mounted at positions around a window in a build chamber with each laser module supporting an optical module and a free end of each laser module/optical module arrangement cantilevered over the window. This presents a number of challenges, firstly each laser module/optical module arrangement must be mounted accurately with respect to the build chamber in order to ensure that each laser beam is directed to the correct place on a powder bed. As the number of lasers increases so does the complexity of assembly of the selective laser solidification device. By providing a single optical module 105 which can receive multiple laser beams, the optical module 105 reduces the complexity of the process of assembling the selective laser solidification device. A second challenge faced by the device of WO 2014/199134 comes about during operation of the device, as the laser beams melt or sinter the powder to form an object, some of the energy of the laser beam is absorbed by components of the optical train (i.e. mirrors) and additionally energy may be reflected by the powder and/or melt pool and then may be absorbed by a laser module/optical module arrangement. This leads to differential heating of the laser module/optical module arrangements with the part of the arrangements facing the build chamber experiencing a greater heating effect when compared to the part of the arrangement distal the build chamber. This can lead to distortion (i.e. bending) of the laser module/optical module assembly which in turn changes an actual position to which the laser beam is directed compared to a nominal/commanded position. As each laser module/optical module arrangement is isolated, each assembly can deform by a different amount and/or in a different manner. While each laser module/optical module arrangement may be connected via parts of the apparatus (such as the build chamber) no thermal connection provided directly between optical trains, on the required timescales in order to achieve an accurate build. Accordingly, optical modules are not thermally connected and distortion of each laser module/optical module arrangement is independent of distortion of the other laser module/optical module arrangements.

By providing an optical module 105 which can receive multiple lasers, the optical module 105 addresses the problem in a number of ways. Firstly, by providing a thermal circuit between each part of the optical module 105 associated with each optical train, the optical module 105 may act as a heat sink and distribute the energy absorbed from the laser or energy absorbed due to reflection of laser energy by the powder and/or melt pool more evenly across the optical module and so reduce localised distortion affecting the path of one laser beam compared to another. The optical trains are thermally linked across window 107. By delocalising any heat energy which may lead to deformation of the optical module 105 across the optical module 105, localised stresses experienced by the optical module 105 will be decreased and the tendency for heating to deform the optical module 105 (including moving the positions where laser beams are received by the optical module 105) will be reduced. Secondly, by fixing the optical module 105 at a plurality of positions around the window 107 or fixing the optical module 105 in place by a single connection which extends at least partially around window 107 or which may encircle window 107 so that the optical module 105 bridges window 107 of the build chamber 101, the optical module 105 has no free end and distortion of the optical module 105 by bending caused by differential heating (i.e. expansion due to heating of a lower side of the optical module 105) is resisted.

By providing optical module 105 with an aperture 123 common to all optical trains, lasers beams 116 can exit the optical module 105 and be directed into a build chamber 101 through a single window 107 in the build chamber 101. It is important to protect the window 107 from, for example condensate settling on the window and many systems exist which are designed to protect the window such as by providing a laminar flow of gas across the window. By providing a single aperture 123 in optical module 105 it is possible to reduce the total area of window 107 to be smaller than the equivalent total window area needed by providing a plurality of windows.

It will be appreciated that while the embodiments shown in the figures and described above relate to a single unitary (single piece) optical module 105 the optical module 105 may in other embodiments comprise more than one optical module arrangement which have been thermally linked to provide a common thermal circuit between optical trains of the optical module 105, the thermal connection in use extending across a window 107 located in a build chamber 101. By providing thermal connection between optical trains of the optical module 105 a thermal bridge is provided across a window 107 of build chamber 101.

FIG. 6 shows a module bridging window 107, the module comprising an optical module 105 mounted within a metrological frame 124. In FIG. 6 laser beams 116a, 116c are shown being delivered to laser beam receiver portions 120 of optical module 105 along fibres 121a, 121c which may be optical fibres, however this need not be the case and it will be appreciated that laser beams could be generated by laser sources received within laser beam receiver portions 120 such as laser sources 1, 2, 3, 4 in the embodiments shown in FIGS. 1, 2 and 5. As can be seen in the embodiment of FIG. 6 the optical module 105 is not directly attached to the build chamber, rather the optical module 105 is mounted within a metrological frame 124. Metrological frame 124 comprises a lower plate 125 (i.e. a plate which in use is mounted proximal the build chamber 101) and an upper plate 127 (i.e. a plate which in use is mounted distal the build chamber 101). Lower plate 125 may be a reflective plate designed to reflect any laser light that has been reflected by the powder and/or melt pool. Lower plate 125 may be a plate which may be reflective and which may comprise a window or aperture corresponding to the opening in the lower face of optical module 105 in order to allow passage of laser beams 116. Lower plate 125 and upper plate 127 in the illustrated embodiment are joined by sides 126. Sides 126 may be provided on a pair of opposing sides of metrological frame 124 or may be provided on all sides of metrological frame 124. If, as is the case in the embodiment shown in FIG. 6 laser beams are generated outside metrological frame 124, sides 126 may be able to transmit laser beams and direct the laser beams into optical module 105 which may be by optical fibres 121 shown in FIG. 6. This need not be the case and metrological frame 124 may be provided with aperture(s) in order to allow laser beams 116 to enter metrological frame 124 and optical module 105 and directing the laser beams 116 along an optical pathway using reflective, refractive, diffractive elements or the like. FIG. 6 shows fibres 121a, 121c passing through the optical frame 124 and being coupled to laser beam receiver portions 120a, 120c, in other embodiments the fibres may be coupled to the metrological frame 124 and the metrological frame 124 may provide an optical pathway directing the laser beams 116 into laser beam receiving portions 120 using reflective, refractive, diffractive elements or the like. Lower plate 125 may be made from material chosen for its resistance to bending due to differential heating of upper and lower faces, this may include factors such as stiffness and/or specific heat capacity and/or thermal conductivity, lower plate 125 may be made from aluminum or steel or any other suitable metal or material. Upper plate 127 may be chosen for its resistance to bending, this may include factors such as stiffness and/or thermal conductivity and/or specific heat capacity etc., upper plate 127 may be made from aluminum or steel or any other suitable metal or material. Metrological frame 124 may further include reinforcing elements (not shown) in order to resist bending and may also include cooling channels (not shown) which may form a thermal circuit across part or the whole of lower plate 125. In the embodiment shown in FIG. 6 a module window 117 (not shown) similar to that disclosed in FIG. 5 may be provided. Module window 117 may be located within the housing 115 in a similar manner to that shown in FIG. 5 or may be provided in and/or as part of lower plate 125.

While optical module 105 has been described as extending beyond/being larger than window 107 of build chamber 101 above (for example the embodiment shown in FIGS. 1 and 2), it will be appreciated that that need not be the case for the embodiment shown in FIG. 6. The optical module 105 of FIG. 6 is not directly attached to build chamber 101, rather optical module 105 is attached to build chamber 101 via lower plate 125 of metrological frame 124. As long as lower plate 125 of metrological frame 124 is attached, in use, at a plurality of positions around window 107 or fixed in place by a single connection which extends at least partially around window 107 and which may encircle the window 107 then benefits of such mounting can be experienced even if optical module 105 is not sized to span window 107. In other embodiments one, some, many or each/all of the features of the metrological frame 124 (for example reflective plate 125 or stiffeners) may be provided by the optical module 105. In further embodiments the optical module 105 may be made up of a plurality of optical module arrangements to provide a plurality of optical trains within metrological frame 124.

FIG. 7 shows an alternative configuration of optical module 105. It can be seen that laser beam receiver portions 120 and beam director module receiver portions 122 are located in a different arrangement when compared to the embodiment of FIG. 3. It will be appreciated that the location of laser beam receiver portions 120 and beam director module receiver portions 122 may, in some embodiments be dictated by factors external to the optical module 105 such as space available in the additive manufacturing apparatus, in other embodiments the location of laser beam receiver portions 120 and beam director module receiver portions 122 may be chosen based on the area of the powder bed 104 to which laser beams 116 may be directed. This may include positioning laser beam receiver portions 120 and beam director module receiver portions 122 so that all laser beams may be directed to substantially all of a powder bed or alternatively so that the scanning zones 119 to which the laser beams 116 may be directed cover less than substantially all of a powder bed (each such scanning zone 119 may or may not overlap with other scanning zones 119). In some embodiments of an additive manufacturing apparatus, the additive manufacturing apparatus may comprise the optical module 105 and be operated with a single laser beam produced by a single laser source, alternatively in other embodiments the additive manufacturing apparatus comprising the optical module 105 may be operated with more than a single laser beam, for example two, three, four or more laser beams from a single laser source or from more than one laser source.

FIG. 8 shows a further alternative configuration of optical module 105. It can be seen that laser beam receiver portions 120 and beam director module receiver portions 122 are located in a different arrangement when compared to the previous embodiments. Unlike the previously described embodiments, FIG. 8 shows window 107 of build chamber 101 extending beyond the periphery of housing 115 in one direction and that the housing bridges the window 107 in a second direction thus allowing attaching of the optical module 105 to the build chamber 101 so the optical module bridges the build chamber window 107 and attachment of the housing 115 to the build chamber 101 at a plurality of positions around a window 107 is possible.

FIG. 9a shows a module similar to that shown in FIG. 8. In FIG. 9a the module 105 is fixed to a build chamber 101 of an additive manufacturing apparatus in a manner to bridge a window 107 (shown in phantom) of the build chamber 101. In this embodiment of an additive manufacturing apparatus, window 107 in build chamber 101 is smaller than the footprint of optical module 105. By providing an optical module 105 which is larger than a window 107 in a build chamber 101, the optical module 105 may completely cover the window 107 in build chamber 101. By covering the window 107 in build chamber 101 no laser light from the build chamber 101 is allowed to escape the additive manufacturing apparatus via a path passing through window 107 in the build chamber 101. In other words, by providing an optical module 105 which is larger than a window 107 in a build chamber 101 it is possible to render the build chamber 101 "light tight". While window 107 in the build chamber 101 in the illustrated embodiment is shown as being substantially circular this need not be the case and the window 107 may be any suitable shape, for example window 107 in build chamber 101 may be substantially polygonal and may be substantially square or substantially rectangular.

The embodiment of an optical module 105 mounted to a build chamber 101 of an additive manufacturing apparatus shown in FIG. 9a provides four optical trains. Each optical has an associated irradiation volume 129. Each irradiation volume 129 provides a scanning zone 119a, 119b, 119c, 119d on a working plane within the additive manufacturing apparatus. FIG. 9b illustrates the scanning zones 119a, 119b, 119c, 119d of the apparatus shown in FIG. 9a. The total area on a working plane that can be irradiated by the optical module 105 is the combine area of scanning zones 119a, 119b, 119c, 119d. In FIG. 9b, scanning zone 119a is demarked by a solid line while scanning zones 119b, 119c and 119d are demarked by dashed lines. Within scanning zone 119a an overlap area 150 is shown represents an area to which each/all of laser beams 116a, 116b, 116c, 116d can be directed. Overlap area 151 represents an area to which both/each of laser beams 116a, 116b may be directed, overlap area 154 represents an area to which both/each of laser beams 116a, 116d may be directed and area 155 is an area to which only laser beam 116a may be directed. In addition to the relevant areas described in connection with scanning zone 119a scanning zone 119b has an area 156 to which only laser beam 116b may be directed, scanning zone 119c has an area 157 to which only laser beam 116c may be directed, and scanning zone 119d has an area 158 to which only laser beam 116d may be directed, overlap area 152 represents an area to which both/each of laser beams 116c, 116c may be directed, and overlap area 153 represents an area to which both/each of laser beams 116c, 116d may be directed.

The additive manufacturing apparatus may be arranged such that the width in a direction W of optical module 105 (shown in FIG. 9a) is not more than (and may be less than or the same as) the width (in a direction W of FIG. 9b) of the total area which can be scanned. By providing an optical module 105, which is able to scan an area on a working plane that at least as wide as the module 105 itself, the area which may be scanned can be extended by providing a plurality of optical modules 105 as an array.

FIG. 10 shows a plurality of optical modules 105a, 105b, 105c arranged in a one dimensional array. While FIG. 10 shows three optical modules 105a, 105b, 105c it will be appreciated that two, three, four, five, ten, twenty or more optical modules 105 may be arranged in such an array. In further embodiments, optical modules 105a, 105b, 105c arranged in the array may not be spaced apart as is shown in FIG. 10 but may abut in order to provide thermal connection between modules 105a, 105b, 105c of the array. Spacing of optical modules 105a, 105b, 105c within the array of FIG. 10 allows for overlap of areas on a working plane to which laser beams 116 from neighbouring optical modules 105a, 105b, 105c may be directed, i.e. to provide areas on the working plane which can be irradiated by laser beams from more than one optical module which may be by providing an optical module 105, which is able to scan an area on a working plane that at least as wide as the module 105 itself. Such an array also allows scanning strategies for building of objects to be optimised as is disclosed by WO 2014/199134.

FIG. 10c illustrates one example of scanning zones and overlap areas which the array of FIG. 10a could be arranged to produce on a working plane within a build chamber 101 of an additive manufacturing apparatus. In this example overlap area 150 is the area to which all/each of the laser beams 116 from optical module 105a may be directed, overlap area 250 is the area to which all/each of the laser beams 116 from optical module 105b may be directed, and overlap area 350 is the area to which all/each of the laser beams 116 from optical module 105c may be directed. Overlap areas 151, 251, 351 represents areas to which both/each of laser beams 116a, 116b of respective optical modules 105a, 105b, 105c may be directed while overlap areas 153, 253, 353 represents areas to which both/each of laser beams 116c, 116d of respective optical modules 105a, 105b, 105c may be directed. Overlap area 152 represent the area to which laser beams 116b, 116c from optical module 105a and laser beams 116a, 116d from optical module 105b may be directed. Overlap area 252 represent the area to which laser beams 116b, 116c from optical module 105b and laser beams 116a, 116d from optical module 105c may be directed. Overlap area 154 represent the area to which laser beams 116a, 116d from optical module 105a may be directed and overlap area 352 represent the area to which laser beams 116b, 116c from optical module 105c may be directed. Corner areas 155, 356, 257, 158 represent areas which only a single laser may be directed to and overlap areas 156, 256, 257, 157 represent areas to which two laser beams, each from a different module may be directed. It will be appreciated that may other configurations are possible including arranging the optical modules in an array such that overlap areas 150, 250, 350 are contiguous.

An image capture device 143 may be provided. The image capture device 143 may be provided between the beam director module receiver portions 122 of the optical module as shown in FIG. 10b. The image capture device 143 may allow an optical train of an optical module, which may be the optical train which comprises beam director module 106b of optical module 105a to be calibrated as disclosed in application GB 1604728.4 (see Annex 1). More than one optical module 105a, 105b, 105c of the array may be provided with an image capture device 143.

Additionally or alternatively, a further image capture device may be able to view a region of the working plane through the optical train. The further image capture deice may be provided in an optical train associated with beam director module 106a of optical module 105b. The further image capture device may be able to capture an image of scanning zone 119a to which beam director module 106a of optical module 105b may direct a laser beam. As overlap area 156 and overlap area 157 form part of scanning zone 119a, the further image capture device may capture an image containing a laser beam directed into overlap areas 156 or 152 by beam director module 106b of optical module 105a and/or an image containing a laser beam directed into overlap area 152 by beam director module 106c of optical module 105a. This allows calibration of the optical train comprising beam director module 106a of optical module 105b against either of the optical trains containing beam directors 106b or 106c of optical module 105a. As optical trains which comprise beam directors 106b, 106c, 106d of optical module 105b have scanning zones that at least partially overlap the scanning zone that comprises beam director module 106a of optical module 105b, the further image capture device can be used to calibrate said optical trains against the optical train comprising beam director module 106a of optical module 105b. If a yet further image capture device (similar to the further image capture device) is provided in the optical train comprising beam director module 106a of optical module 105c then the optical trains of optical module 105c can be calibrated against the optical trains of optical module 105b in a similar manner. It will be appreciated that the further image capture device need not be provided in the optical train comprising beam director module 106a of optical module 105b but could be provided in any optical train which can direct a laser beam to a/any of overlap areas 156, 152, 157 and the still further image capture device could be provided in any optical train which can direct a laser beam to a/any of overlap areas 256, 252, 257, an additional still further image capture device could be provided in any optical train which can direct a laser beam to a/any of overlap areas 351, 350, 353. Calibration may be as described in GB 1607152.4 (see Annex 2).

By providing an image capture device 143 in at least one optical module of an array of optical modules, it is possible to calibrate at least one optical train of the at least one optical module. By providing a further image capture device within an optical train which can direct a laser beam to an overlap area which a laser beam or beams from the at least one optical module and from an at least one further optical module may be directed, it is possible to calibrate the at least one further optical module against the at least one optical module. By providing a yet further image capture device within an optical train which can direct a laser beam to an overlap area which a laser beam or beams from the at least one further optical module and from an at least one still further optical module may be directed, it is possible to calibrate the at least one still further optical module against the at least one optical module (via the at least one further optical module). Such a strategy can be used to calibrate an entire array of optical modules relative to the at least one optical module.

FIG. 11 shows a module comprising an array of optical modules 105 movably mounted to guides 141 via rails 140. The figure shows windows 107 located within a build chamber 101 in phantom and also shows only part of guides 141. Optical modules 105 are fixably connected to rails 140, rails 140 are movably connected to guides 141. In use, guides 141 are fixed within an additive manufacturing apparatus and may be fixably mounted to a build chamber 101 to allow rails 140 to bridge window 107 of the build chamber 101. Guides 141 are sized and positioned to allow the array of optical modules 105 to be moved to allow irradiation of a desired area within the build chamber 101. A motor (not shown) which may be controlled by computer 130 may be used to move rails 140 and therefore the array of optical modules 105 relative to a working plane within the build chamber 101. Movement of the rails 140 and therefore the array of optical modules 105 relative to the working plane within the build chamber 101 may be in one dimension and may be continuous movement or may be movement between a number of indexed positions. In order for the build chamber 101 to be light tight windows 107 in the build chamber 101 may move with the array, this may be achieved for example by providing the build chamber with a concertinaed surface which can allow movement of the windows 107 therein. While FIG. 11 shows the optical modules 105 of the array having lasers such as lasers 1, 2, 3, 4 this need not be the case and the optical modules 105 may receive lasers via fibres from one or more lasers. The movable module of FIG. 11 may be provided within the build chamber.

FIG. 12*a* shows a further alternative embodiment of an optical module 105 mounted to a build chamber 101 within an additive manufacturing apparatus. A window 107 located within a build chamber 101 is shown in phantom. In this embodiment of the optical module, lasers 1, 2, 3, 4 are provided from a side of the optical module 105 distal to the build chamber 101. This is an example of one way the footprint of the optical module 105 can be reduced.

FIG. 12*b* shows a two-dimensional array of optical modules 105, 205, 305, 405, 505, 605, 705, 805, 905. While nine optical modules arranged in three rows and three columns are illustrated this is merely an example and more or fewer optical modules may be provided in such an array. The array need not be square as illustrated by may extend further in a first direction than in a second direction. The optical modules may be arranged in two or more rows and two or more columns. In some embodiments the optical modules within the array abut one another. In order to provide a continuously irradiated area on a working plane each optical module of the two-dimensional array illustrated is arranged to irradiate an area at least the size of the footprint of the optical module on the build chamber. In the embodiment shown in FIG. 12*b*, each optical module is arranged within the additive manufacturing machine such that the area which may be scanned by each optical module overlaps with areas which may be scanned by neighbouring optical modules.

FIG. 12*c* illustrates one example of scanning zones and overlap areas which the array of FIG. 12*b* could be arranged to produce on a working plane within a build chamber 101 of an additive manufacturing apparatus. In this example overlap area 150 is the area to which all/each of the laser beams 116 from optical module 105 may be directed, overlap area 250 is the area to which all/each of the laser beams 116 from optical module 205 may be directed, overlap area 350 is the area to which all/each of the laser beams 116 from optical module 305 may be directed, overlap area 450 is the area to which all/each of the laser beams 116 from optical module 405 may be directed, overlap area 550 is the area to which all/each of the laser beams 116 from optical module 505 may be directed, overlap area 650 is the area to which all/each of the laser beams 116 from optical module 605 may be directed, overlap area 750 is the area to which all/each of the laser beams 116 from optical module 705 may be directed, overlap area 850 is the area to which all/each of the laser beams 116 from optical module 805 may be directed, and overlap area 950 is the area to which all/each of the laser beams 116 from optical module 905 may be directed.

In FIG. 12*c* the scanning zone on the working plane to which optical module 505 may direct laser beams is represented by areas 550, 551, 552, 553, 554, 555, 556, 557 and 558. In the illustrated embodiment overlap area 550 represents the area to which each/all laser beams from optical module 505 may be directed and in the current embodiment laser beams form other optical modules in the array may not be directed to overlap area 550 although this need not necessarily be the case in other embodiments. Overlap area 551 represents the area to which two laser beams from module 505 and two laser beams from module 205 may be directed. Overlap area 552 represents the area to which two laser beams from module 505 and two laser beams from module 605 may be directed. Overlap area 553 represents the area to which two laser beams from module 505 and two laser beams from module 805 may be directed. Overlap area 554 represents the area to which two laser beams from module 505 and two laser beams from module 405 may be directed. Overlap area 555 represents the area to which one laser beams from module 505, one laser beam from module 405, one laser and one laser beam from module 105 and one laser beam from module 205 may be directed. Overlap area 556 represents the area to which one laser beams from module 505, one laser beam from module 205, one laser and one laser beam from module 305 and one laser beam from module 605 may be directed. Overlap area 557 represents the area to which one laser beams from module 505, one laser beam from module 605, one laser and one laser beam from module 905 and one laser beam from module 805 may be directed. Overlap area 558 represents the area to which one laser beams from module 505, one laser beam from module 805, one laser and one laser beam from module 705 and one laser beam from module 405 may be directed.

As illustrated in FIG. 12*b*, optical module 505 has a first pair of neighbouring optical modules 205, 805 in a first direction and a second pair of neighbouring optical modules 405, 605 in a second direction, the second direction may be perpendicular to the first direction. In the three-by-three array shown in FIG. 12*b*, it will be appreciated that while all optical modules shown are of the sort shown and described in relation to FIG. 12*a*, each of optical modules 105, 205, 305, 405, 605, 705, 805 and 905 (i.e. all illustrated optical modules except optical module 505) may be have components which do not need to fall within a footprint of the optical module housing on the build chamber 101, which footprint in the illustrated embodiment is not greater than a scanning zone on a working plane to which laser beams from the optical module may be directed. This is not the case for optical module 505. As optical module 505 is surrounded by first 205, 805 and second 405, 605 pairs of optical modules in first and second directions, the footprint of the optical module 505 on the build chamber 101, in order to achieve a continuously irradiatable area on a working plane must not be greater than a scanning zone on a working plane to which optical module 505 may direct lasers. By providing this feature the optical module 105 shown in FIG. 12*a* allows a two-dimensional array to extend in both of the first and second directions by more than two units, i.e. the optical module 105 shown in FIG. 12*a* allows arrays of optical modules 105 of a size X-by-Y where X>2 and Y>2.

ANNEX 1

GB 1604728.4

CALIBRATION OF ADDITIVE MANUFACTURING APPARATUS

Field of Invention

This invention concerns a method for calibrating a scanner of an additive manufacturing apparatus and an additive manufacturing apparatus for carrying out the method. In particular, but not exclusively, the invention concerns a method for calibrating a scanner of an additive manufacturing apparatus comprising a material bed (e.g. powder or resin bed).

Background

Additive manufacturing or rapid prototyping methods for producing parts comprise layer-by-layer solidification of a material. There are various additive manufacturing methods, including powder bed systems, such as selective laser melting (SLM), selective laser sintering (SLS), electron beam melting (eBeam) and stereolithography, and non-powder bed systems, such as fused deposition modelling, including wire arc additive manufacturing (WAAM).

In selective laser melting, a powder layer is deposited on a powder bed in a build chamber and a laser beam is scanned across portions of the powder layer that correspond to a cross-section (slice) of the workpiece being constructed. The laser beam melts or sinters the powder to form a solidified layer. After selective solidification of a layer, the powder bed is lowered by a thickness of the newly solidified layer and a further layer of powder is spread over the surface and solidified, as required.

To form a workpiece accurately the scanner has to be calibrated.

WO94/15265 discloses placing a Mylar sheet with a large number of square cells printed thereon on a target surface and marking each cell with the laser beam. The sheet is then converted into digital form by scanning with a conventional digital scanner and the location of the laser mark relative to the centroid of the cell is used to update the correction factors for that cell. Such a calibration is carried out periodically.

US5832415 discloses a method for calibrating the deflection control of a laser beam for a rapid prototyping system. A light-sensitive medium is exposed to a laser beam at predetermined positions for generating a test pattern. A video camera is progressively moved across the produced test pattern so as to produce corresponding pattern portions of the test pattern with the camera. An evaluation program is used for composing the digitized pattern portions to an overall pattern. The picture coordinates of the overall pattern are compared with the digitized coordinates of a photomechanically produced reference pattern. A correction table required for control of the scanner for deflecting the laser beam is modified on the basis of the comparison.

US6483596 discloses a method for calibrating the control of a radiation device in a rapid prototyping system, wherein a calibration plate is arranged at a defined position in the rapid prototyping system. The calibration plate has an upper side with a first region and second region separate from the first region. The first region is provided with optically detectable reference crosses and the second region has a medium which is sensitive to the radiation of the radiation device. A test pattern of crosses is produced by exposing the medium to the radiation at predetermined desired positions defined by position coordinate data. The first and second regions are digitised, for example by means of a pixel scanner, a video camera or a digital camera, and correction data is calculated from comparing the reference crosses and crosses of the test pattern.

EP2186625 discloses a method to correct for geometric distortion of digital light projectors used in a rapid prototyping system. A camera is used to view an uncompensated test pattern created by each digital light projector. Each uncompensated test pattern is compared with the ideal test pattern to generate a pattern correction map.

WO2014/180971 discloses a method of automatic calibration of a device for generative production of a three-dimensional workpiece comprising first and second scanners. On an applied layer of material or a target, a first test pattern is produced using the first scanner and a second test pattern is produced using the second scanner. The first and second test patterns may be a specific grating pattern with a specific lattice constant or a dot pattern. A calibrated camera is used to capture an image of the first and second test patterns and compare the first and second test patterns to a reference pattern stored in memory of a control device. The first and second scanners are calibrated such that deviations of the corresponding test patterns from the reference pattern fall below a desired value. The calibration method may comprise an auto-correlation method or matching method.

It is desirable to provide a method of calibrating a scanner of an additive manufacturing apparatus to an accuracy that is an order of magnitude greater than a spatial resolution provided by pixels of an image capturing device used for the calibration.

Summary of Invention

According to a sixth aspect of the invention there is provided a method of calibrating a scanner of an additive manufacturing apparatus, in which an energy beam is directed with the scanner to consolidate material in a working plane to build up a workpiece in a layer-by-layer manner, the method comprising directing the energy beam with the scanner across a test surface in the working plane to form a test pattern, the test pattern comprising at least one periodic feature, capturing an image of the test pattern, determining from the image a periodic property of the test pattern and determining correction data for control of the scanner based upon the periodic property.

By basing the correction on the periodic property of the test pattern more accurate correction data can be determined. In particular, the periodic property may be determined with more accuracy than a position of a geometric feature of the test pattern because the periodic property is based upon information determined from multiple ones of the geometric features (e.g. information averaged across multiple ones of the geometric features) rather than being dependent on a resolution of a single one of the geometric features.

The periodic property may be a phase shift of the test pattern relative to a reference phase. A phase of the test pattern may by indicative of an error in position of the energy beam when forming the test pattern and correction data is determined from the phase shift to correct positioning of the energy beam by the scanner.

A phase shift of a pattern can be determined from the image with a greater degree of accuracy than a position of one of the geometric elements of the pattern. Accordingly, basing the correction data on a determined phase shift can improve the accuracy of the correction data. Furthermore, a lower resolution imaging device, such as a camera, may be used compared to the prior art methods whilst still achieving the same or better accuracy for the correction data.

The phase shift may be determined through Fourier analysis of the image. The phase shift may be determined by carrying out a discrete Fourier transform of the image of the test pattern at a reference frequency and determining the phase shift of a resultant frequency component from the reference phase. A value for the phase shift may be determined for each region of plurality of different regions of the test pattern. Correction data may be determined by fitting a mathematical model of the scanner to the determined phase shifts. Each region may be less than a centimetre squared.

The method may comprise locating a reference surface of a calibration artefact in a working plane of the additive manufacturing apparatus, the reference surface having a reference pattern thereon, capturing an image of the reference pattern and determining the phase shift between the test pattern and the reference pattern. The image of the reference pattern may be captured using the same image capture device used to capture an image of the test pattern. The image capture device may be located in the same location(s) in the additive manufacturing apparatus for the capture of the images of the test pattern and the reference pattern. The reference surface may be located in the same location in the additive manufacturing apparatus as a surface on which the test pattern is formed. In this way, repeatable distortions in the test pattern introduced by the image capture device can be eliminated through comparison with the reference pattern which have been distorted in a corresponding manner, i.e. the image capture device is used as a comparator rather than a calibrated measuring device.

The method may comprise carrying out multiple discrete Fourier transforms of the image of the reference pattern at the reference frequency with a basic sinusoid used for the discrete Fourier transform spatially shifted relative to the image of the reference pattern to identify a position of the basic sinusoid that results in highest amplitude for the discrete Fourier transform. This may align the basic sinusoid with the position of the reference pattern in the image. The method may further comprise carrying out a discrete Fourier transform of the image of the test pattern using the basic sinusoid at the identified position relative to the image.

The test pattern may comprise a first pattern comprising a first geometric feature repeated in a first direction and a second pattern comprising a second geometric feature repeated in a second direction, perpendicular to the first direction. The first and second geometric features may be the same (but rotated to the corresponding first and second direction) or different. Each of the first and second directions may correspond to a spatial direction in which the energy beam is moved by a different steering element of the scanner. The first pattern and second pattern may be interspersed without overlap between the geometric features of each pattern.

The test pattern may comprise a series of parallel lines. The test pattern may comprise at least one first set of parallel lines that repeat in the first direction and at least one second set of parallel lines that repeat in the second direction. First sets of parallel lines may alternate with parallel lines of the second set across the test surface in both the first and second directions.

The repeated geometric feature of the test pattern may correlate with the regular spatial intervals of geometric features of a reference pattern and a phase shift may be determined by comparing a phase of the repeated geometric feature of the test pattern to a phase of the corresponding repeated geometric feature of the reference pattern.

The periodic property may comprise summed intensities across each of a plurality of regions of the test pattern in the image, each region comprising at least one period of the test pattern. The method may comprise forming different periodic features of the test pattern with different focal positions of the energy beam relative to the working plane. A periodic property, such as the summed intensity, may be determined for each region of the test pattern formed with the energy beam at one of the different focal positions and focussing optics of the scanner calibrated based upon variations in the summed intensity for the different regions.

The test pattern may comprise a recurring geometric feature, wherein each occurrence of the geometric feature is formed with the energy beam at a different focal position relative to the working plane.

According to a seventh aspect of the invention there is provided a method of calibrating a scanner of an additive manufacturing apparatus, in which an energy beam is directed and focussed with the scanner to consolidate material in a working plane to build up a workpiece in a layer-by-layer manner, the method comprising directing the energy beam across a test surface in the working plane with the scanner to form geometric features on the surface, wherein a focal position of the energy beam relative to the working plane is altered for the formation of different ones of the geometric features, capturing an image of the geometric features, determining an intensity per unit area for each region formed with a different focal position of the energy beam and determining from the variation in intensity per unit area, correction data for correcting control of the focal position of the scanner.

The geometric features may be marks formed on a surface by the energy beam or material consolidated with the energy beam.

According to an eighth aspect of the invention there is provided a controller for controlling an additive manufacturing apparatus, wherein the controller is arranged to carry out the method of the sixth or seventh aspect of the invention.

According to a ninth aspect of the invention there is provided an additive manufacturing apparatus for building up a workpiece in a layer-by-layer manner comprising a scanner for directing an energy beam to consolidate material in a working plane and a controller according to the eighth aspect of the invention.

The additive manufacturing apparatus may further comprise an image capture device for capturing an image of the working plane. The image capture device may comprise a camera. The camera may be located in the additive manufacturing apparatus at a location fixed relative to a datum used to locate the reference surface in the working plane. The apparatus may comprise a wiper arranged to be positioned relative to the datum to form material layers in the working plane.

According to a tenth aspect of the invention there is provided a data carrier having instructions thereon, which, when executed by a controller for controlling an additive manufacturing apparatus, cause the controller to carry out the method of the sixth or seventh aspect of the invention.

The data carrier may be a suitable medium for providing a machine with instructions such as non-transient data carrier, for example a floppy disk, a CD ROM, a DVD ROM / RAM (including - R/-RW and +R/ + RW), an HD DVD, a Blu Ray(TM) disc, a memory (such as a Memory Stick(TM), an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

According to an eleventh aspect of the invention there is provided a fixture for mounting a plate in a working plane of an additive manufacturing apparatus, the fixture comprising a mounting surface for supporting the plate and a three-point mounting formation for contacting a surface to locate the mounting surface in a repeatable position in a direction perpendicular to the working plane.

The mounting surface may be for supporting a calibration plate comprising a reference pattern and a plate to be marked with a test pattern using the energy beam. The fixture may provide an aid to ensure that the reference pattern of the calibration plate and the plate to be marked with the test pattern are aligned in the same plane. This ensures that in the above described calibration method, differences in images of the reference pattern and the test pattern do not arise because the patterns are located at different locations in the additive manufacturing apparatus.

According to a twelfth aspect of the invention there is provided a method of carrying out additive manufacture of a workpiece, in which the workpiece is built by consolidating material in a layer-by-layer manner using an energy beam, the method comprising locating a preform in a working plane of an additive manufacturing apparatus, scanning an energy beam over the preform to form indicia on the preform, machining the preform to form a feature in the preform, wherein a location in which the feature is machined is based upon a location of the indicia, and, after machining the feature, building further features on the preform by consolidating material in layers using the energy beam.

By marking the preform with the energy beam, a location of the coordinate system of the energy beam relative to the preform can be determined and therefore, the feature can be machined into the preform in a location that matches that of the position of the coordinate system of the energy beam. Accordingly, the machined feature will be accurately located relative to the subsequently additively built further features. Such a method may be used in the manufacture of hybrid moulds comprising a base plate having cooling channels preformed therein and an additively built portion having conformal cooling channels arranged to be in fluidic communication with the cooling channels preformed in the base plate. Such a hybrid mould is described in US7261550.

The indicia may comprise a pattern, the method comprising determining a location to form the feature by: capturing an image of the pattern, determining from the image a periodic property of the pattern and determining a location for the feature based upon the periodic property. The periodic property may be a phase of the pattern. The method may comprise adjusting a coordinate system of a machine tool used to form the feature and/or instructions instructing the machine tool in the formation of the feature based upon the determined phase.

Figure 15:
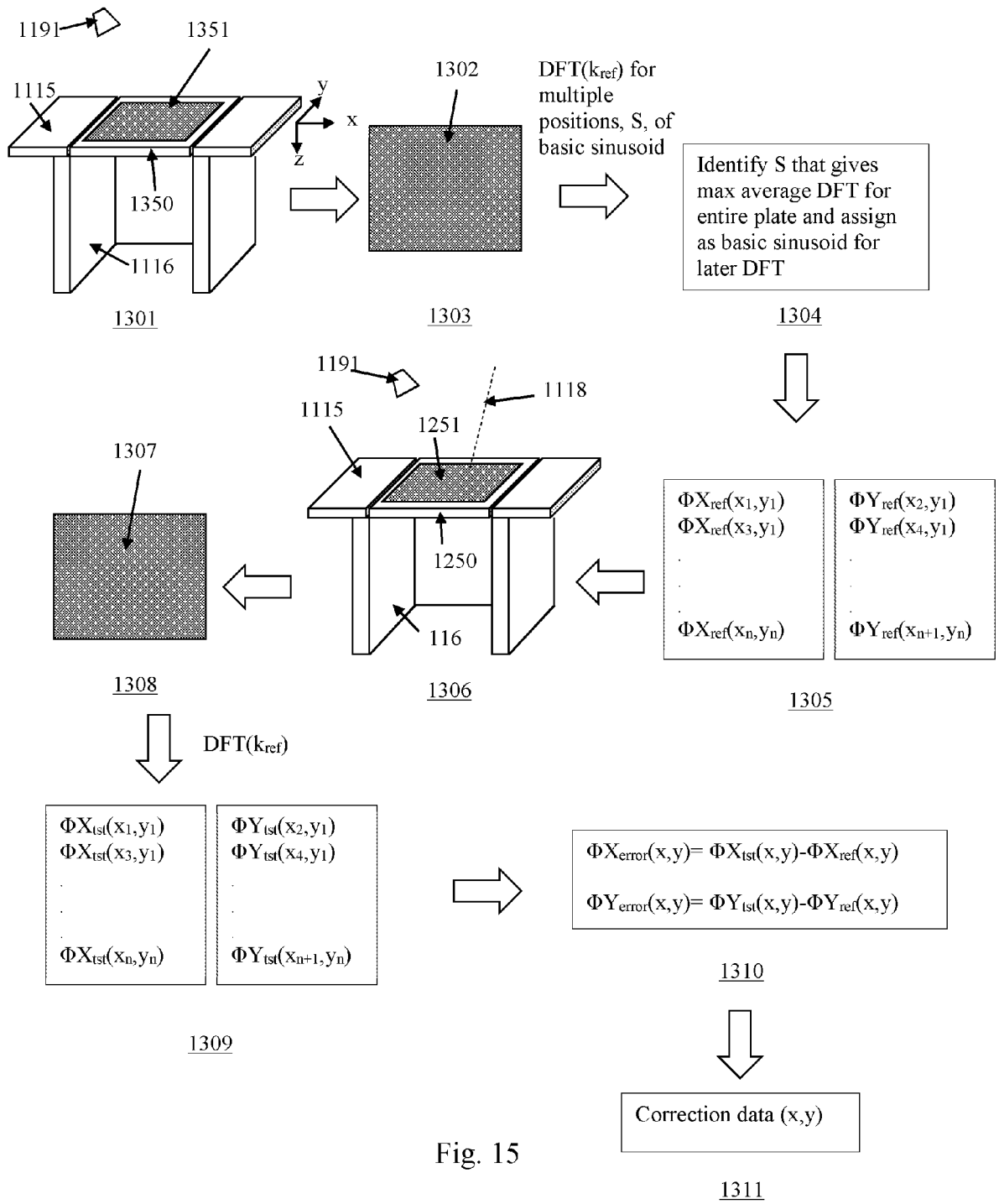
Figure 16:
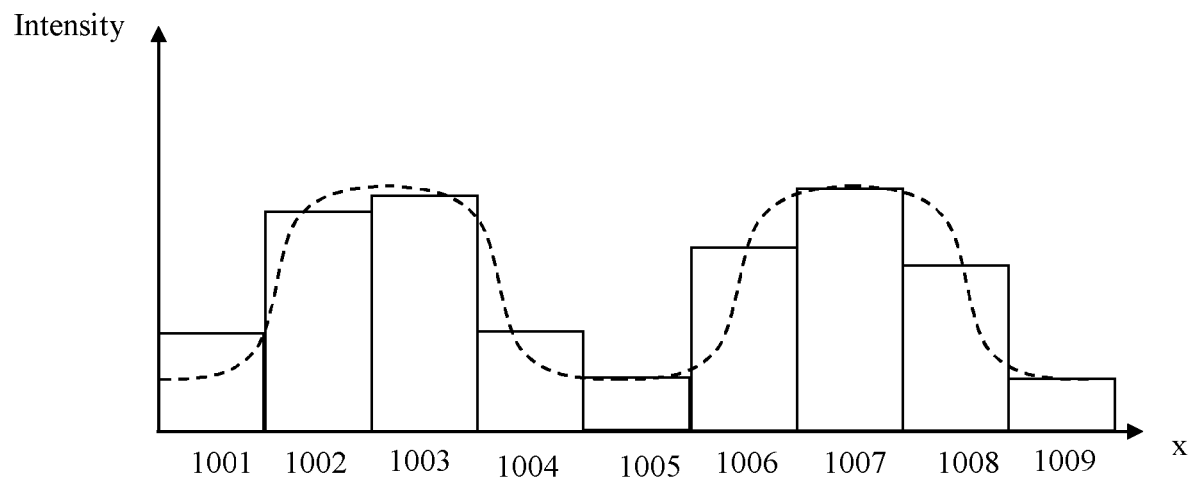
Figure 17:
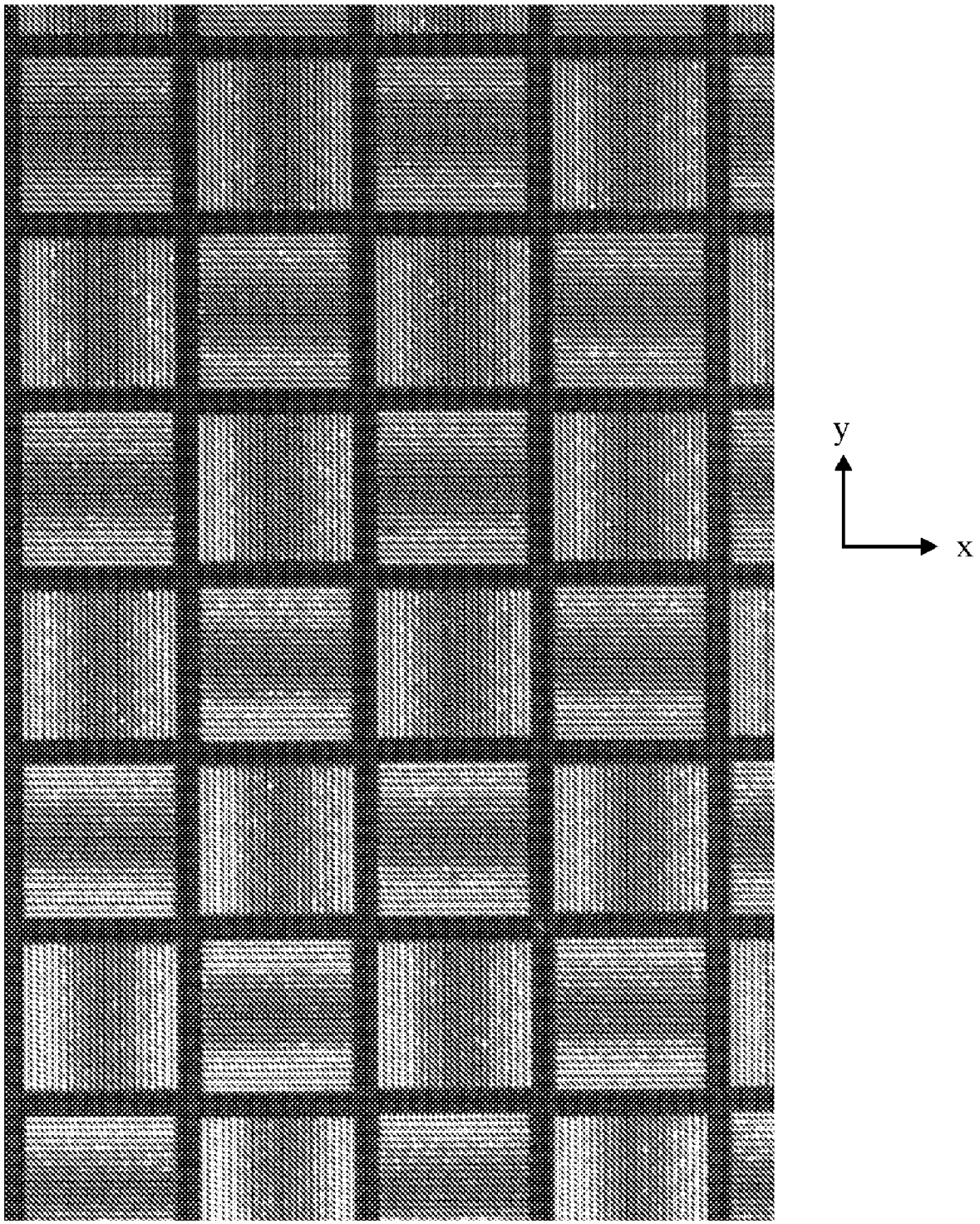
Figure 18:
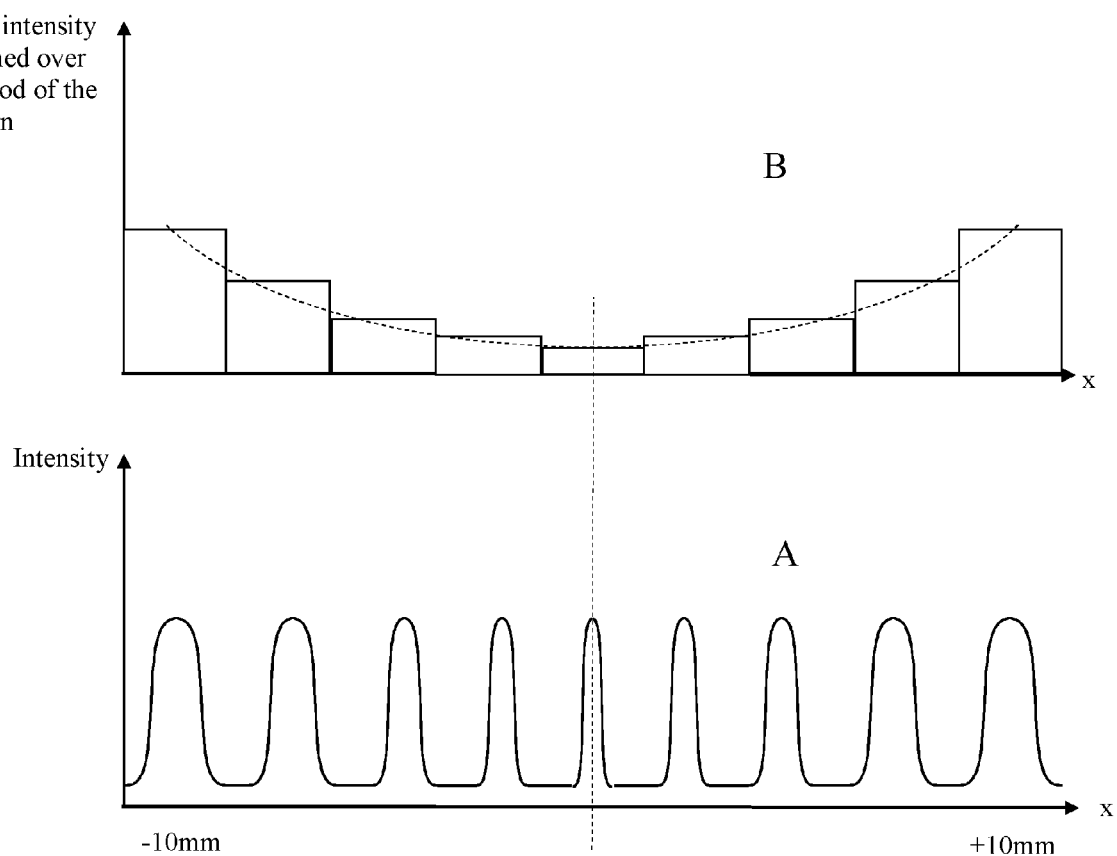
Figure 19:
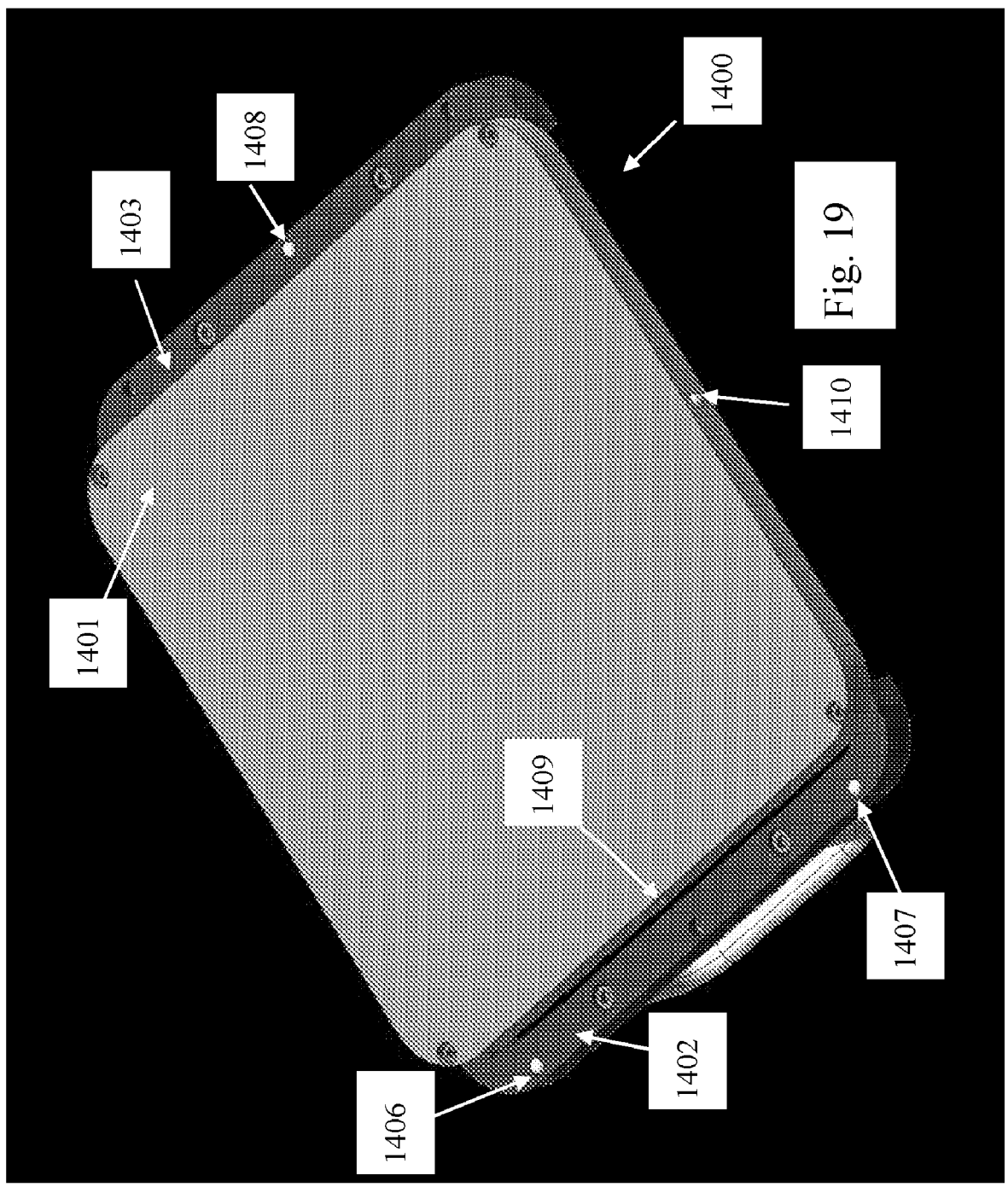
Figure 20:
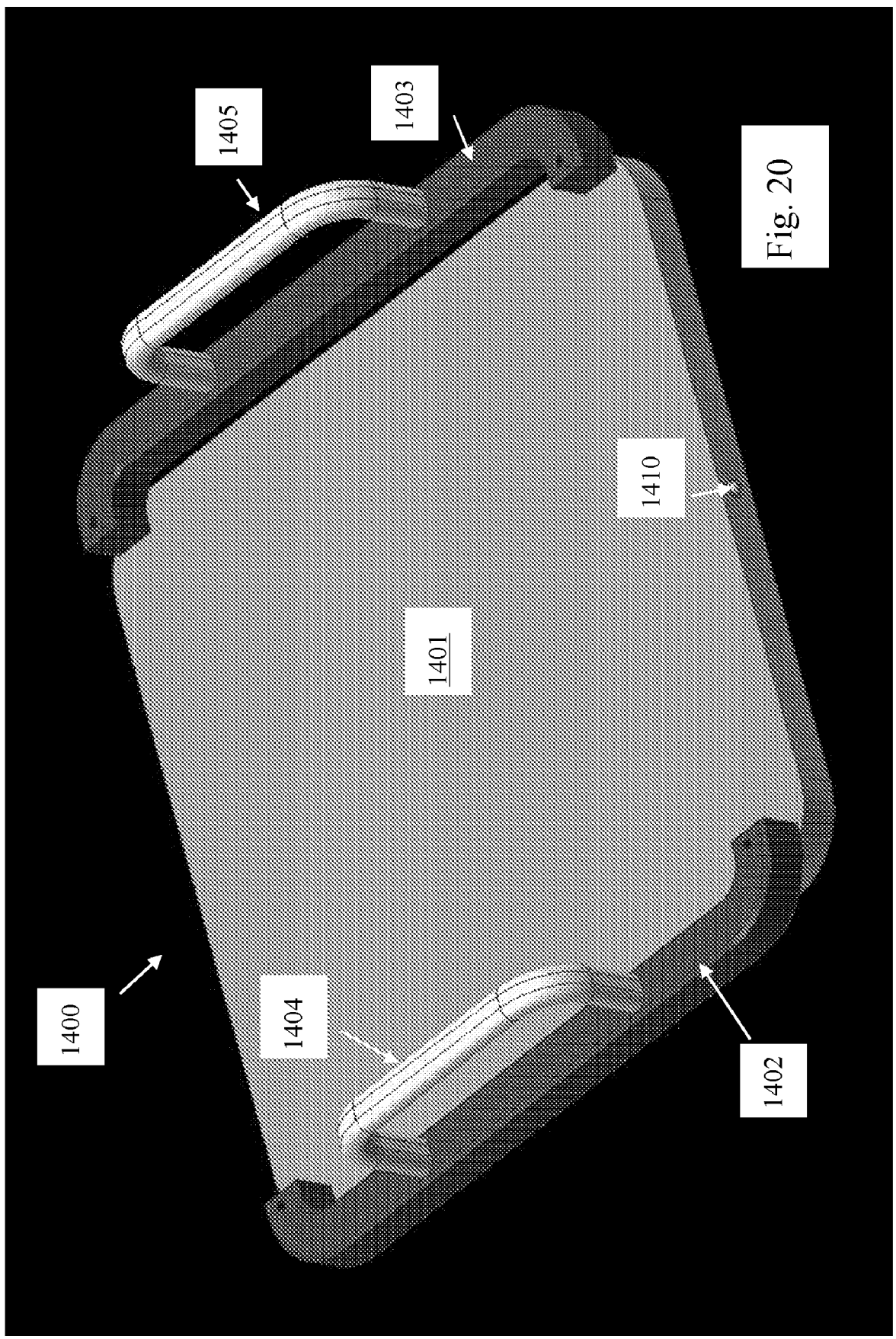

>Figure 15 schematically shows a method of calibrating steering optics of a scanner of an additive manufacturing apparatus according to an embodiment of the invention;

>Figure 16 is a schematic view of typical pixel intensities in an image of the test pattern;

>Figure 17 is a plan view of a test pattern formed on a plate for calibrating focussing optics of the scanner;

Figure 18 is a schematic view of an intensity graph generated from an image of the test pattern shown in Figure 17;

Figure 19 is a perspective view of fixture for mounting the calibration artefact and the test plate in the additive manufacturing apparatus shown from below;

Figure 20 is a perspective view of the fixture from above; and

Figure 21:
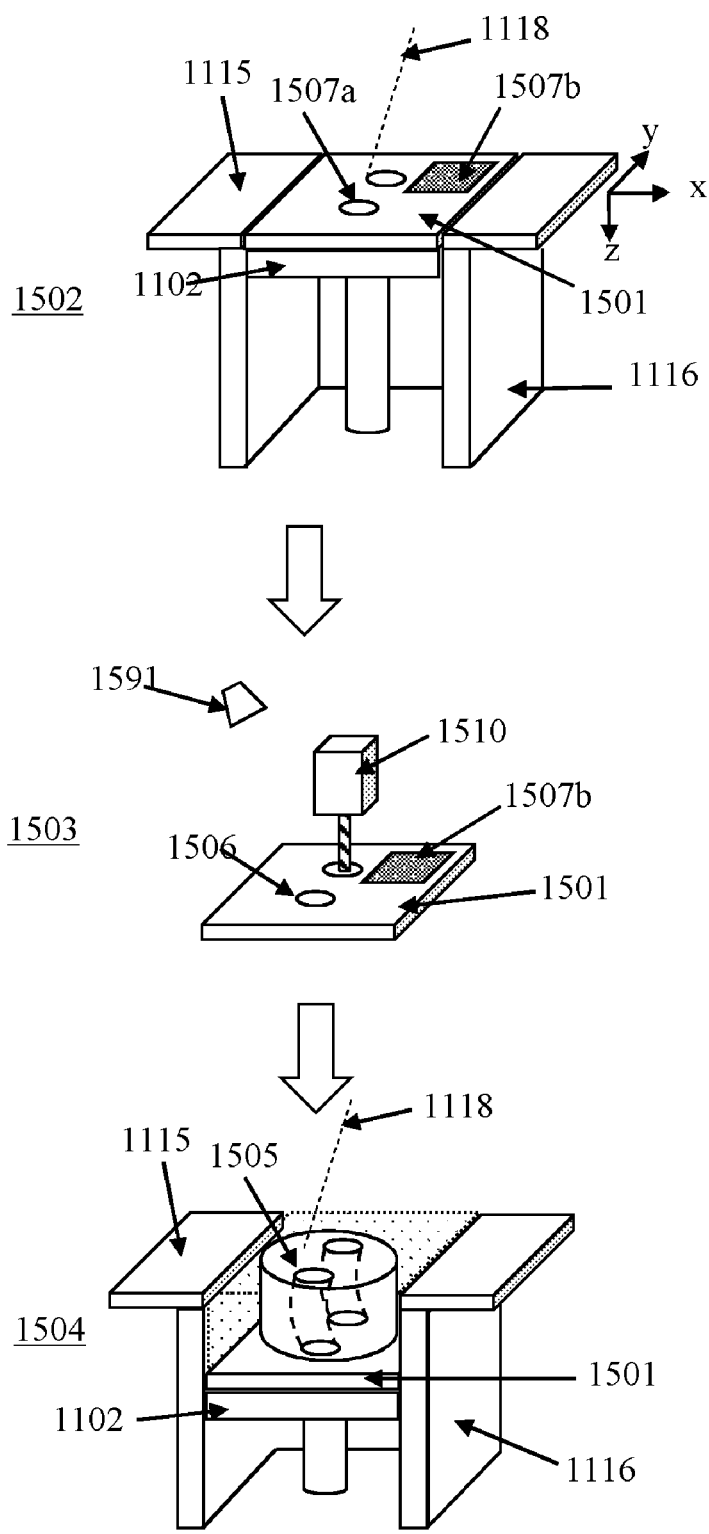

Figure 21 schematically shows a method of forming a hybrid workpiece according to an embodiment of the invention.

Description of Embodiments

Figure 1:
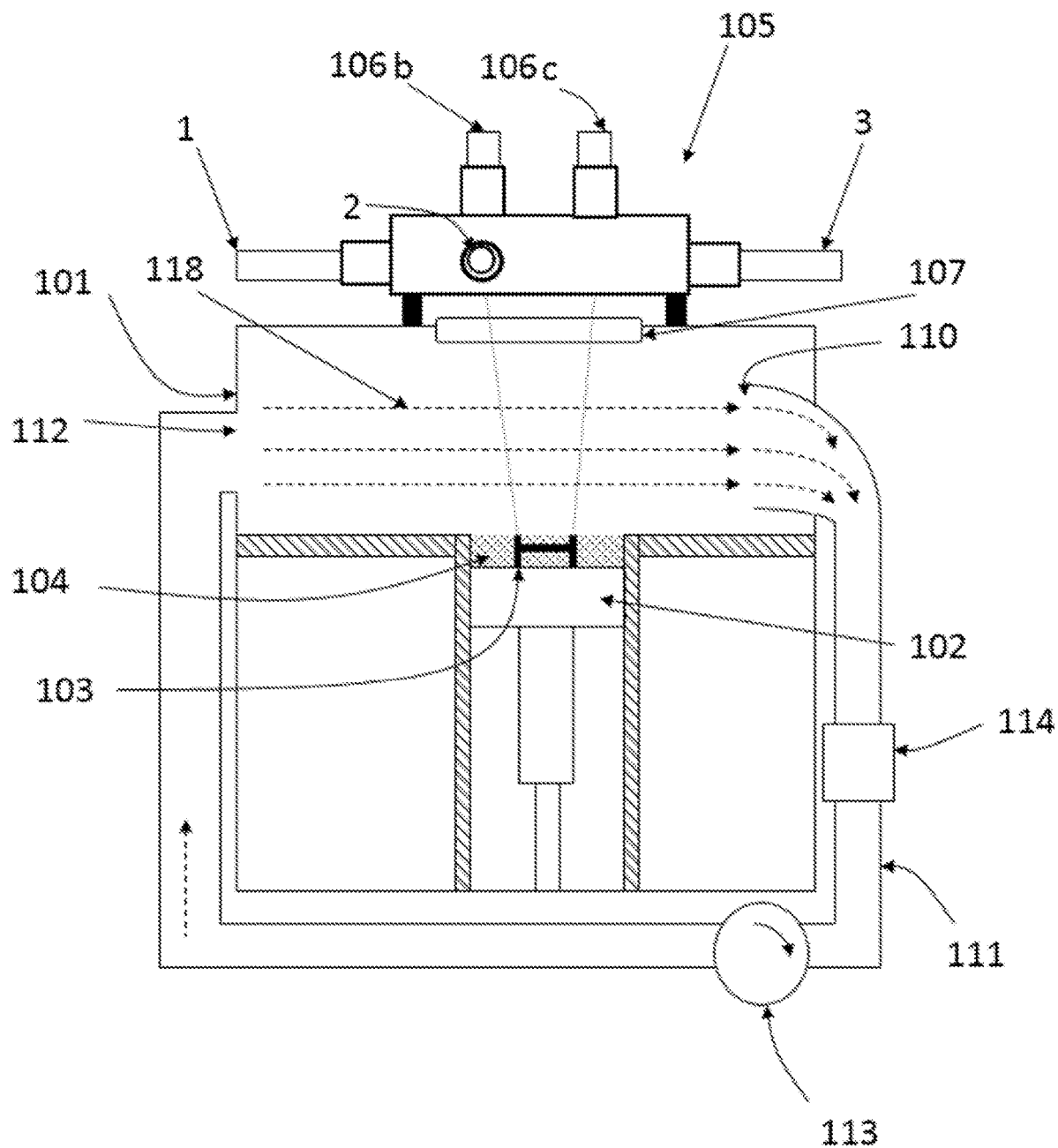
Figure 2:
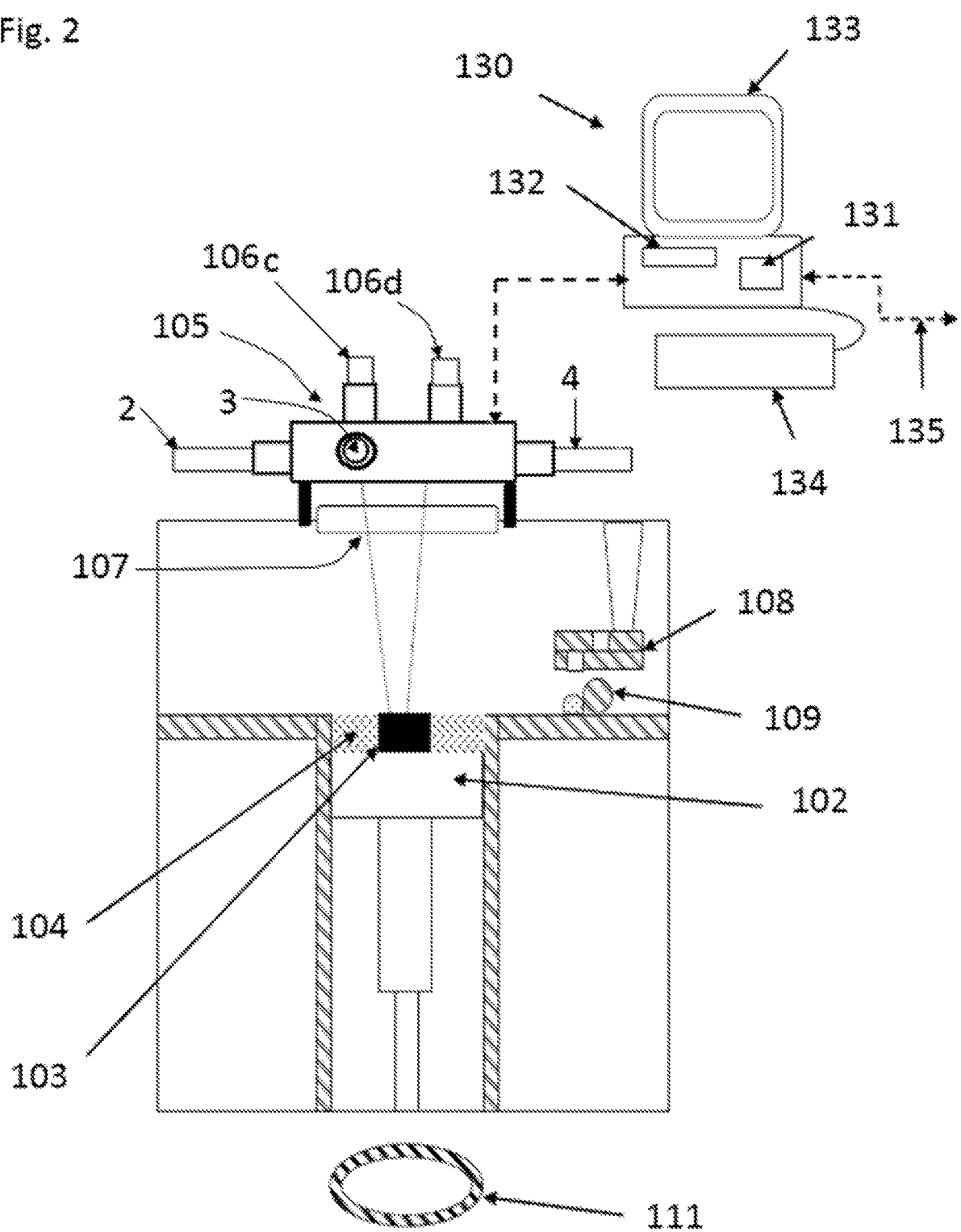
Figure 3:
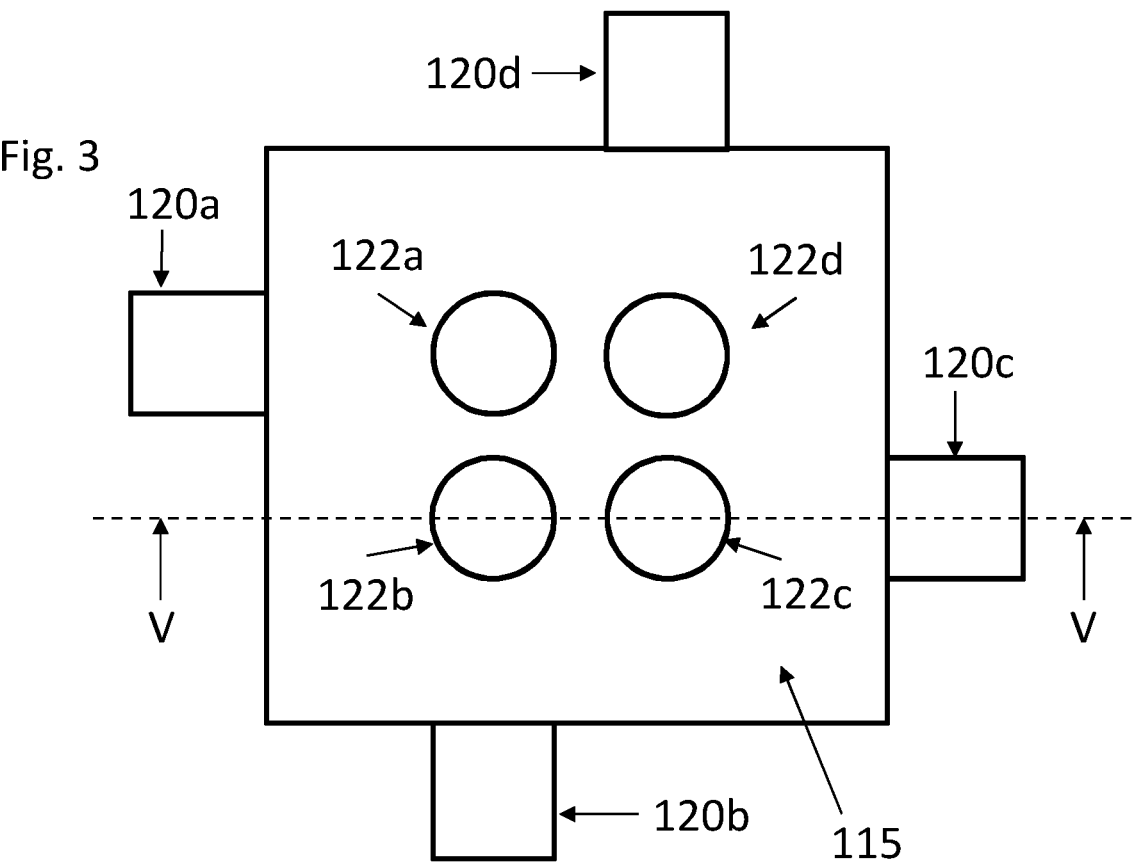
Figure 4:
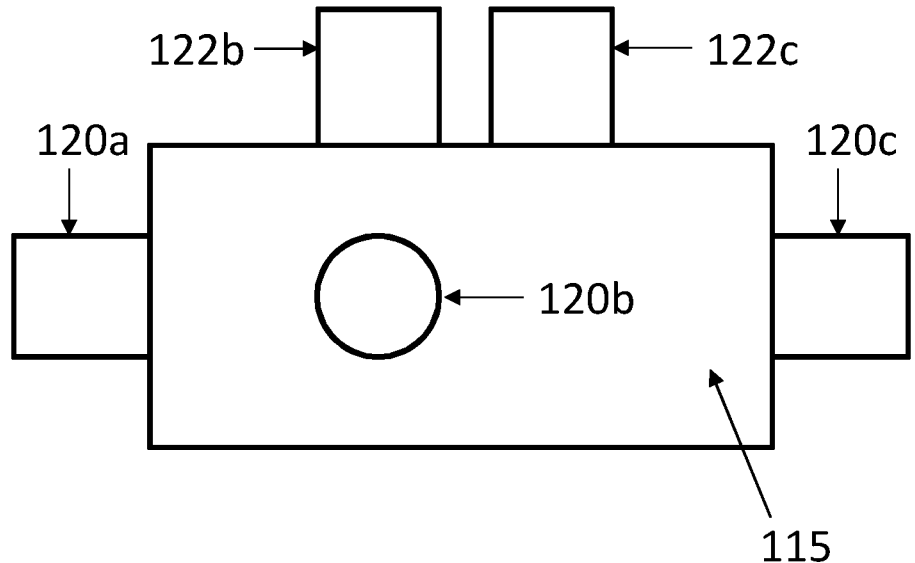
Figure 7:
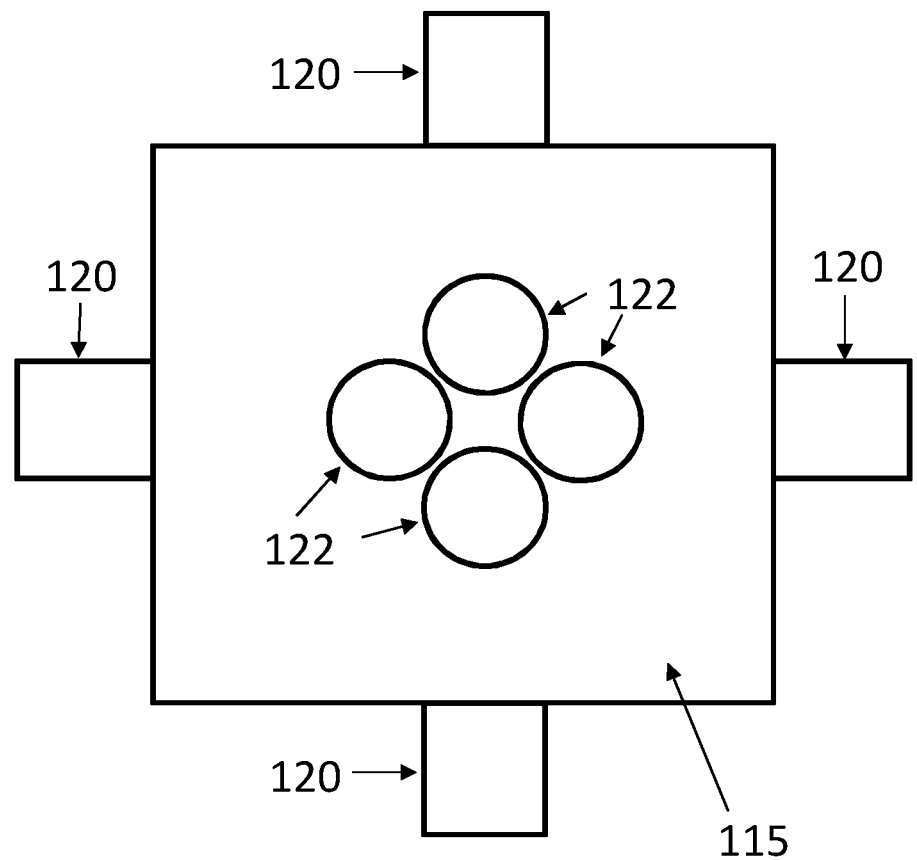
Figure 8:
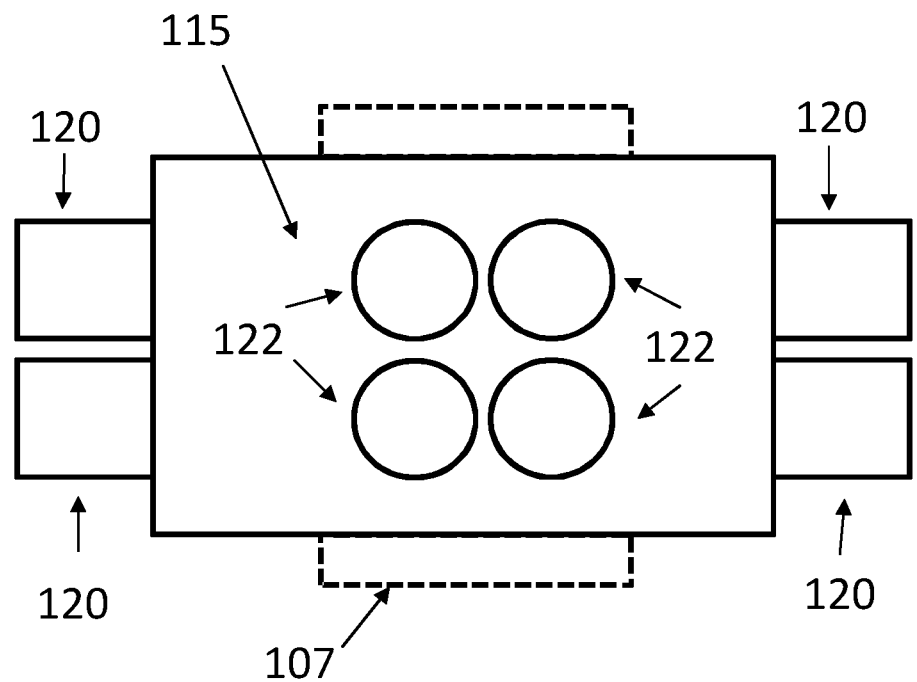
Figure 9A:
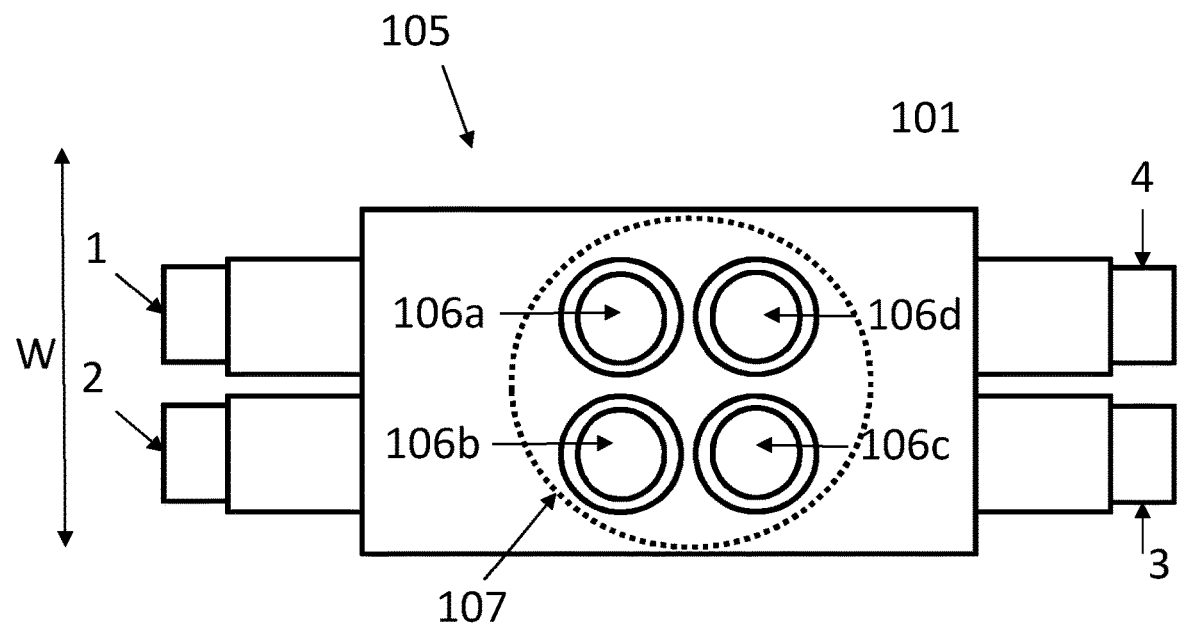
Figure 9B:
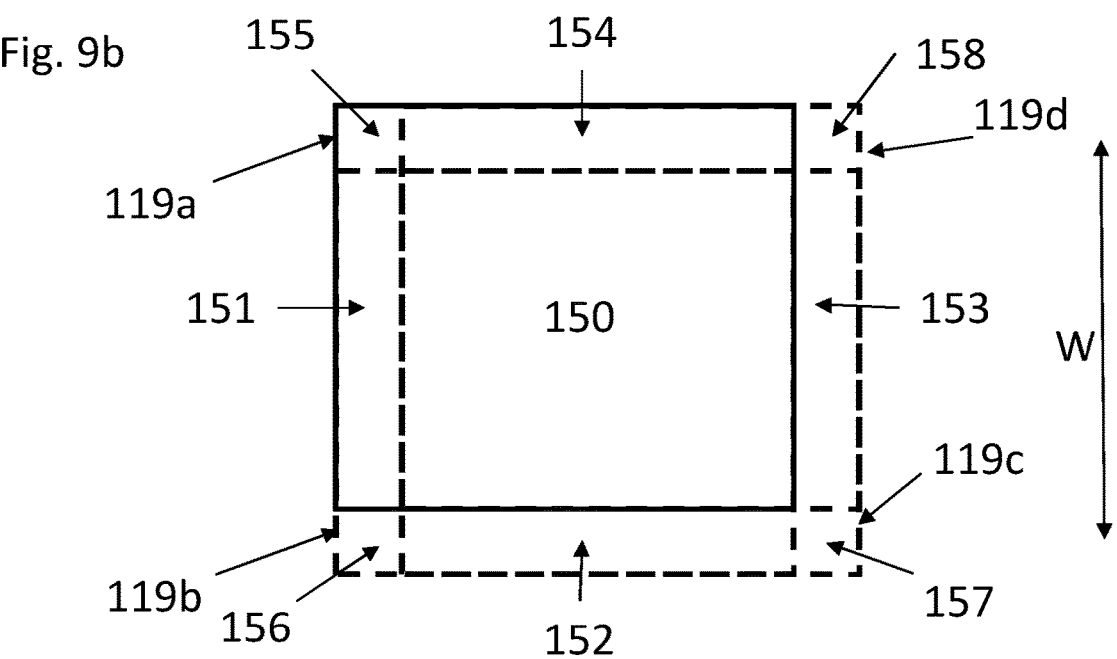
Figure 10A:
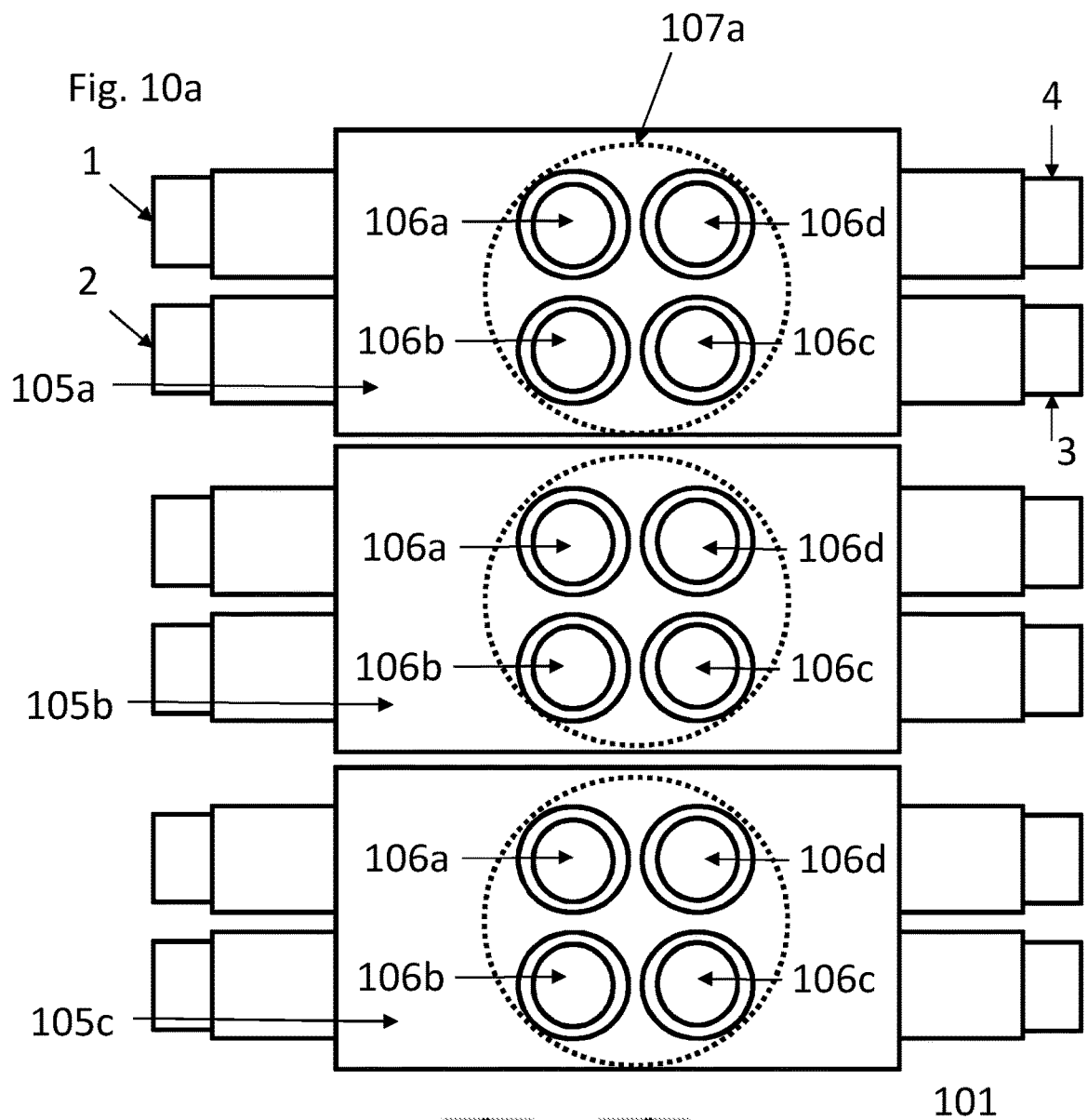
Figure 10B:
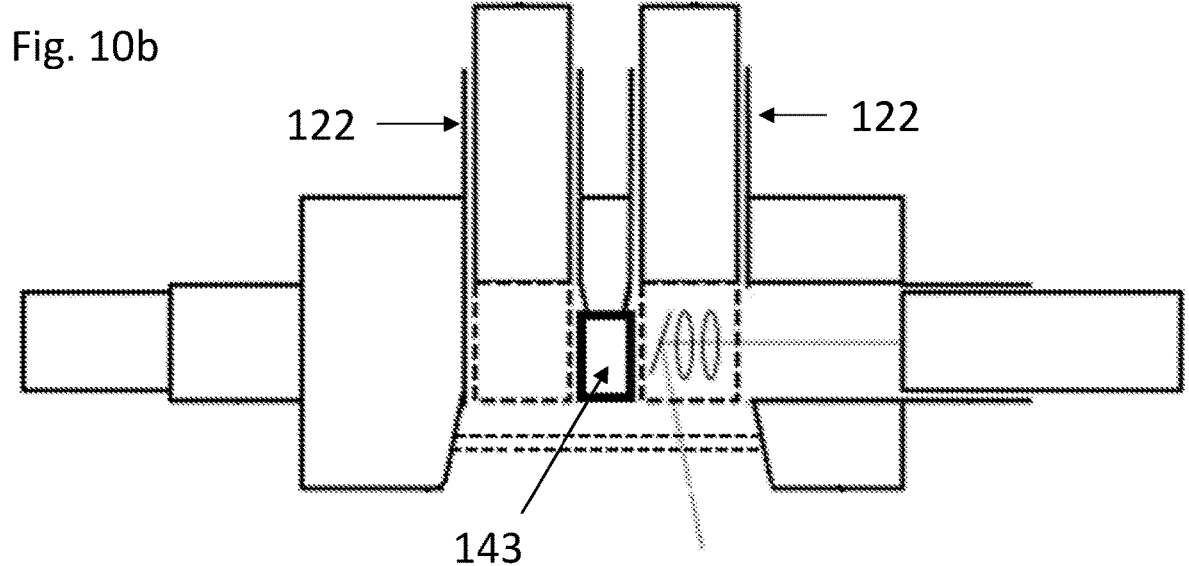
Figure 10C:
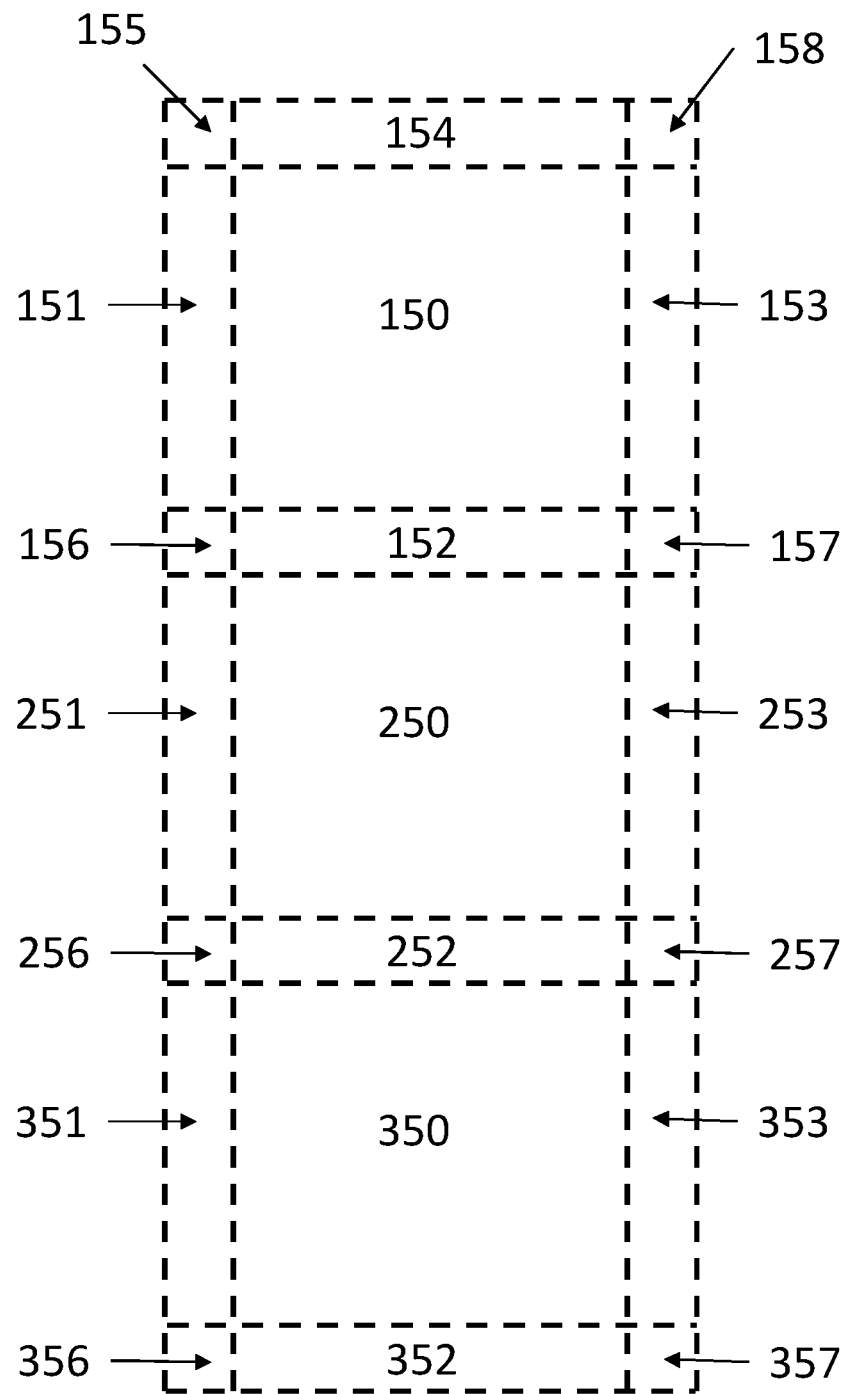
Figure 11:
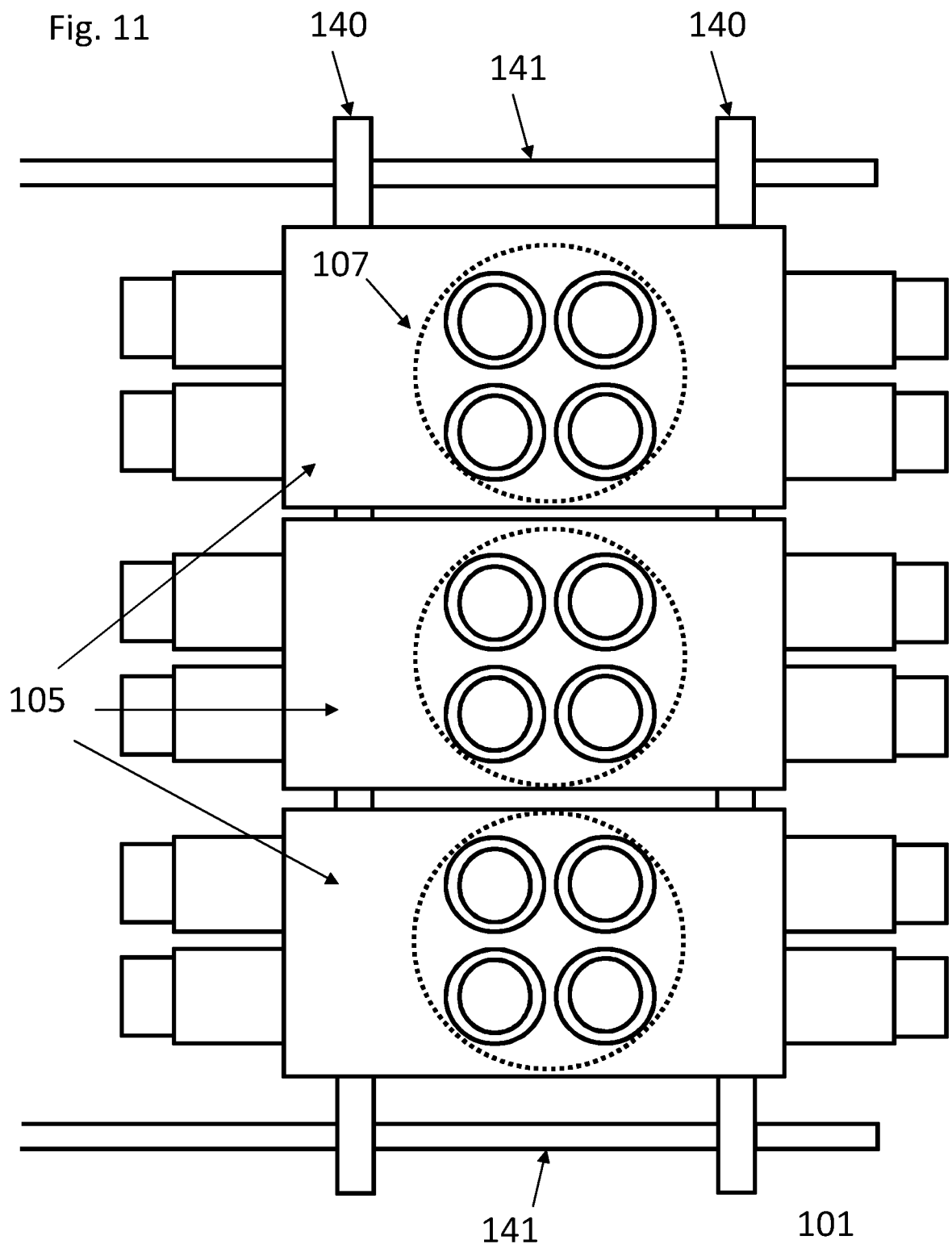
Figure 12A:
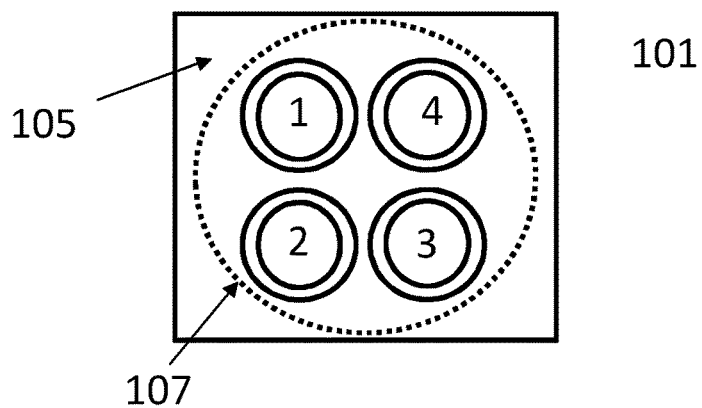
Figure 12B:
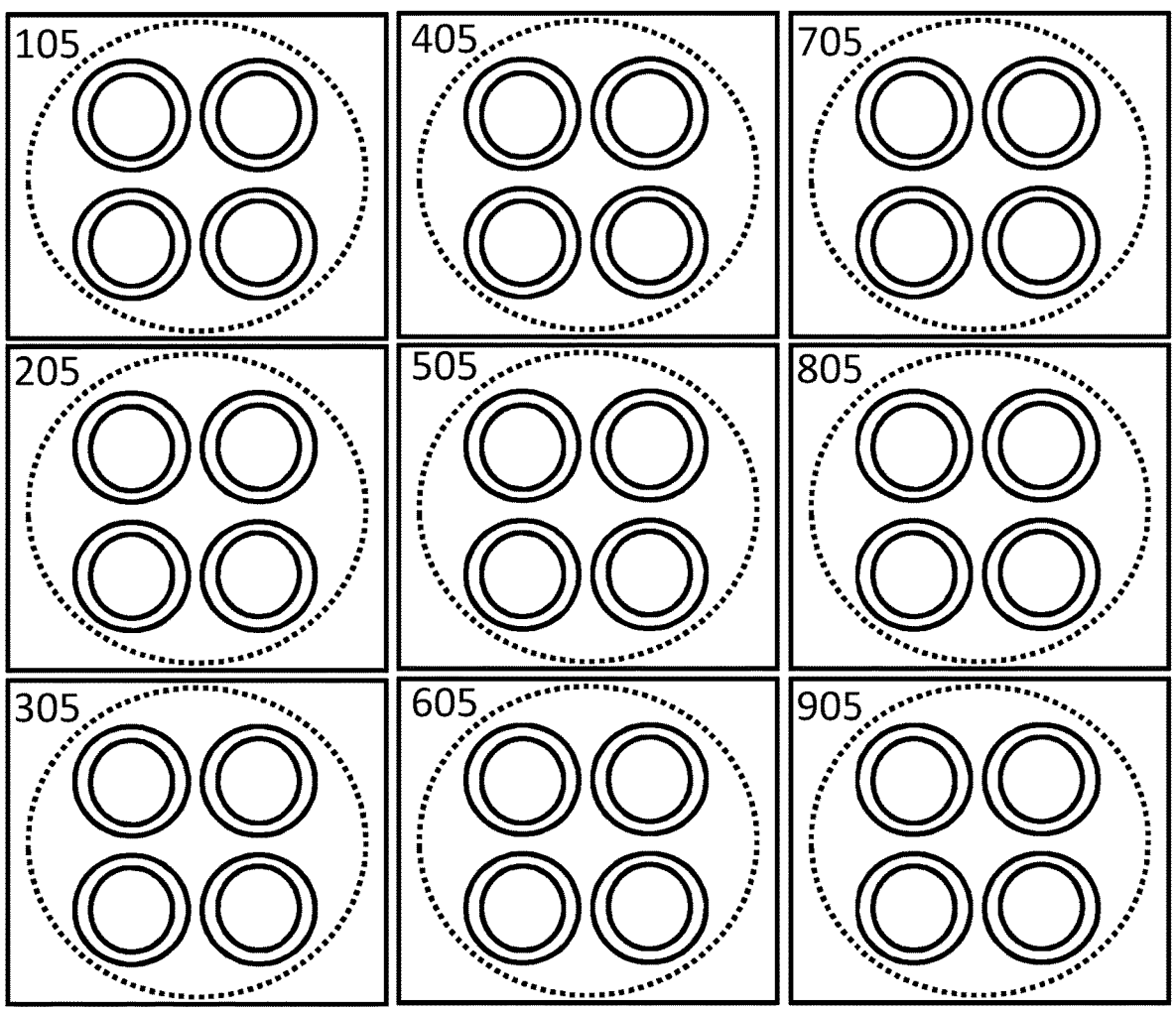
Figure 12C:
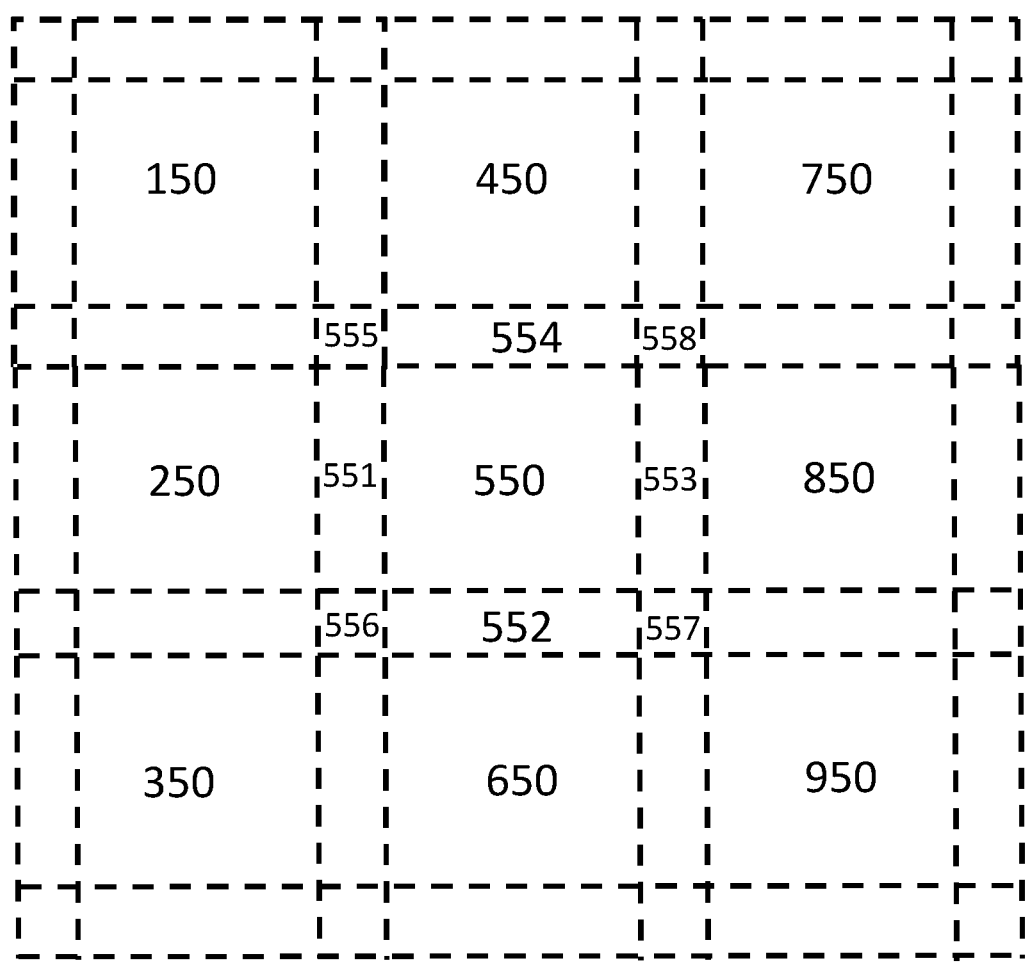
Figure 13:
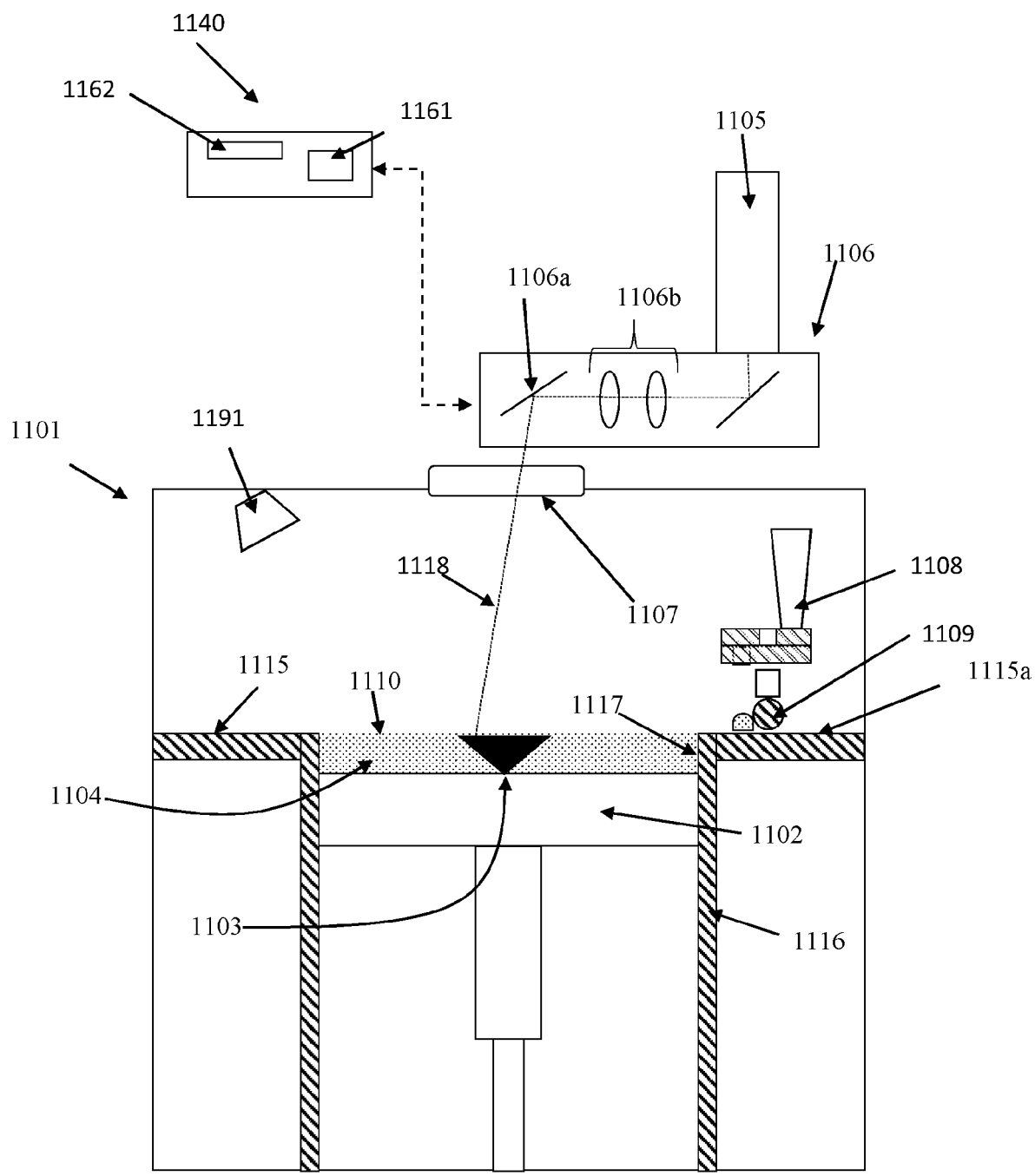
Figure 13 shows an additive manufacturing apparatus according to an embodiment of the invention.

Referring to Figure 13, an additive manufacturing apparatus according to an embodiment of the invention comprises a main chamber 1101 having therein partitions 1115, 1116 that define a build chamber 1117. A build platform 1102 is lowerable in the build chamber 1117. The build platform 1102 supports a powder bed 1104 and workpiece 1103 as the workpiece is built by selective laser melting of the powder. The platform 1102 is lowered within the build chamber 1117 under the control of motor as successive layers of the workpiece 1103 are formed.

Layers of powder 1104 are formed as the workpiece 1103 is built by dispensing apparatus 1108 and a wiper 1109. For example, the dispensing apparatus 108 may be apparatus as described in WO2010/007396. The dispensing apparatus 1108 dispenses powder onto an upper surface 1115a defined by partition 1115 and is spread across the powder bed by wiper 1109. A position of a lower edge of the wiper 1109 defines a working plane 1110 at which powder is consolidated and is adjustable.

A laser module 1105 generates a laser beam 1118 for melting the powder 1104, the laser beam 1118 directed as required by corresponding scanner, in this embodiment optical module 1106. The optical module comprises steering optics 1106a, such a two mirrors mounted on galvanometers, for steering the laser beam 1118 in perpendicular directions across the working plane and focussing optics 1106b, such as two movable lenses for changing the focus of the laser beam 1118. The scanner is controlled such that the focal position of the laser beam 1118 remains in the same plane as the laser beam 1118 is moved across the working plane. Rather than maintaining the focal position of the laser beam in a plane using dynamic focusing elements, an f-theta lens may be used.

A camera 1191 is located in the main chamber 1101 for capturing images of the working plane.

A controller 1140, comprising processor 1161 and memory 1162, is in communication with modules of the additive manufacturing apparatus, namely the laser module 1105, optical module 1106, build platform 1102, dispensing apparatus 1108, wiper 1109 and camera 1191. The controller 1140 controls the modules based upon software stored in memory 1162 as described below.

Figure 14:
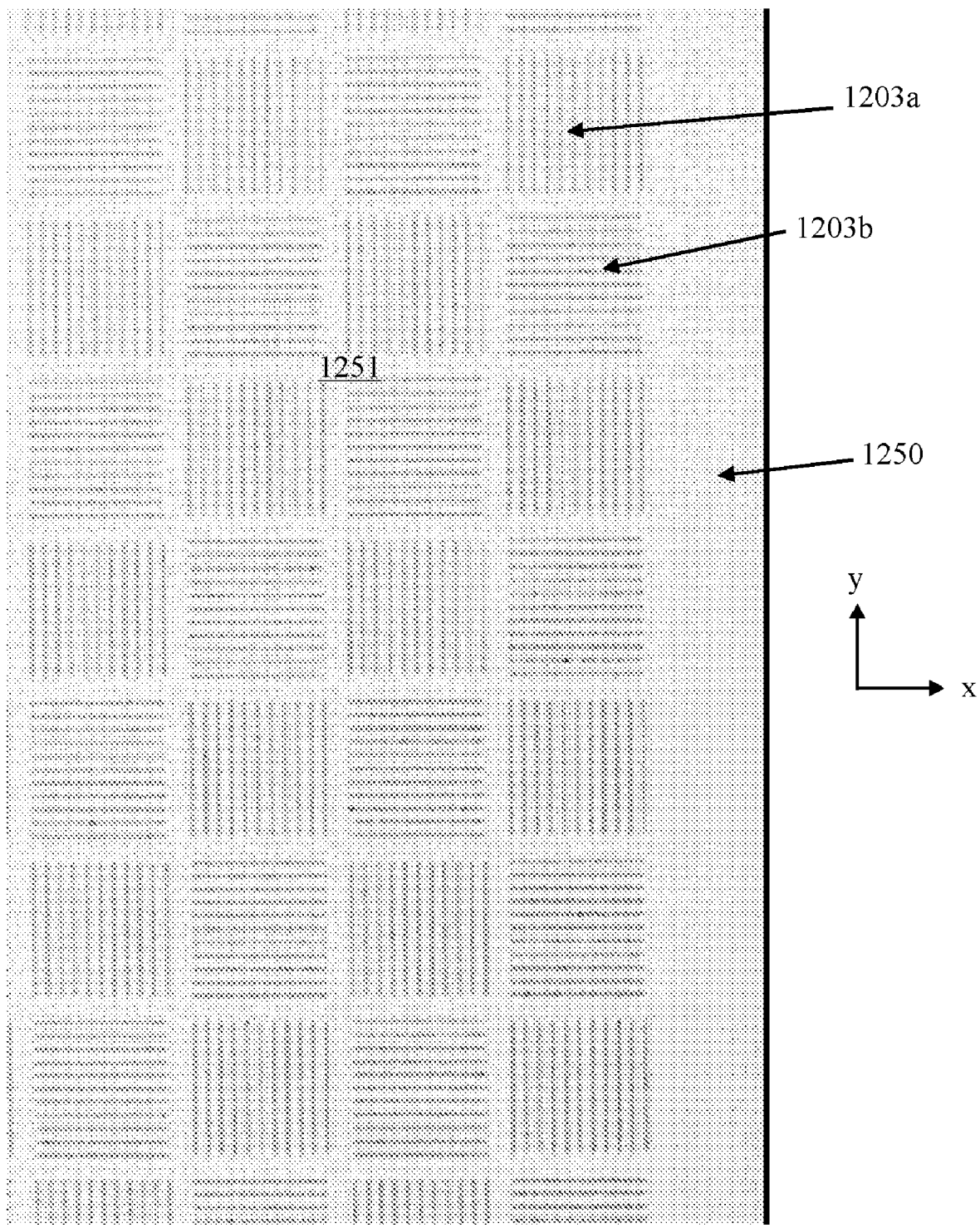
Figure 14 is a plan view of a test pattern according to an embodiment of the invention for calibrating steering optics of a scanner.

Referring to Figures 14 to 16, to calibrate the scanner 1106 the user places 1301 a calibration artefact 1350 comprising a reference pattern 1351 in the additive manufacturing apparatus such that the reference pattern 1351 is located in the working plane 1110. The reference pattern 1351 may be located in the additive manufacturing apparatus using the fixture 1400 described below with reference to Figures 19 and 20. The reference pattern 1351 is the same as the test pattern 1251 shown in Figure 14, with a plurality of regions 1203a and 1203b comprising a series of equally spaced parallel lines. Regions 1203a comprise a plurality of parallel lines spaced apart in the x-direction and regions 1203b comprise a plurality of parallel lines spaced apart in the y-direction. Regions 1203a alternative with regions 1203b in both the x- and y- directions.

A period of the parallel lines is close to a period given by the Nyquist frequency for the camera 1191, i.e. the period is close to four times the spatial resolution of a pixel of the camera 1191 at the working plane. Figure 16 shows how an intensity of pixels 1001-1009 may vary in an image of a portion of a region 1203a, 1203b of pattern 1351, 1251. As can be appreciated from Figure 16, determination of a position of an individual line from such an image will be of the order of the spatial resolution of the image.

The reference pattern 1351 may be printed on a sheet using a suitable technique that is capable of printing patterns to a required accuracy, in this embodiment to an accuracy of a micron or less.

An image 1302 of the reference pattern 1351 in the working plane is captured 1303 using the camera 1191.

A series of discrete Fourier transforms (DFTs) are determined 1304 at the known reference frequency, $k_{ref}$, of the parallel lines of the reference pattern 1351, each using a basic sinusoid shifted to a different position. In this embodiment, the DFT is carried out by multiplying the image 1302 of the reference pattern 1351 by digitally generated sine and cosine representations. The sine and cosine representations are generated such that non-zero sine and cosine regions are spaced apart by zero value regions corresponding to the spaces between regions 1203a, 1203b. To determine a correct alignment of the digitally generated sine and cosine representations with the image of the reference pattern, DFTs are determined using the sine and cosine representations positioned at different positions, $S$, relative to the image of the reference pattern. A magnitude for the DFT is determined for each region and the magnitudes for all regions averaged. The position of the sine and cosine representation that results in the highest average magnitude for the DFT is deemed to be the position, $S_{ref}$, that most closely matches the position of the reference pattern 1351 in the image 1302.

A phase $\Phi X_{ref}$, $\Phi Y_{ref}$ of the reference pattern in each region, denoted by position (x,y) corresponding to the centre of the region, relative to the basic sinusoid is determined 1305 from the DFT and identifying the reference phase for the region. For regions having a pattern with a feature that recurs in the x-direction, a phase shift $\Phi X_{ref}$ in the x-direction is determined and, for regions having a pattern with a feature that recurs in the y-direction, a phase shift $\Phi Y_{ref}$ in the y-direction is determined. The phase shift is determined from the arctan of the quotient of the two values obtained by multiplying the image by the sine and cosine representations.

The reference artefact 1350 is then removed from the additive manufacturing apparatus and replaced 1306 with an aluminium plate 1250 that is also located in the working plane, for example using the fixture 1400 of Figures 19 and 20 that is locatable in a repeatable position in the build chamber 1117. The test pattern 1251 is then marked onto the aluminium plate 1250 using the laser beam 1118 and the scanner 1106. An image 1307 of the test pattern 1251 is captured 1308.

A discrete Fourier transform of the image 1308 of the test pattern 1251 is determined 1307 at the reference frequency, $k_{ref}$, and a phase $\Phi X_{tst}$, $\Phi Y_{tst}$ of the test pattern 1251 from the basic sinusoid in each region 1203a, 1203b is determined 1309.

A phase shift $\Phi X_{error}$, $\Phi Y_{error}$ of the test pattern 1251 from the reference pattern 1351 for each region 1203a, 1203b is determined 1310. A mathematical model, as is known in the art, of the scanner 1106 is then fitted to the determined phase shifts $\Phi X_{error}$, $\Phi Y_{error}$ for each region 1203a, 1203b to determine 1311 correction data, in terms of values for calibration tables, for modifying control of the steering optics 1106a of the scanner 1106.

It is possible for such a method to provide accuracy of measurement to a resolution of $1/100^{th}$ of a pixel. Accordingly, if each pixel has a spatial resolution at the working plane of 150μm, the method can provide a measurement accuracy of 1 or 2μm.

Referring to Figures 17 and 18 the focussing optics of the scanner 1106 are calibrated by forming a test pattern 1251 as shown in Figure 14 on an aluminium sheet located in the working plane wherein the scanner 1106 is controlled to vary a focal point of the laser beam for each line of the pattern of a region, for example, from -10mm below the working plane to +10mm above the working plane. This may result in a pattern on the aluminium sheet as shown in Figure 17.

An intensity in an image of the pattern may vary as shown in graph A of Figure 18, with thicker light lines formed at the edge of the pattern where the laser beam is not focussed in the working plane 1110 to thinner light lines at the centre of a pattern where the laser beam is focussed in the working plane 1110. The total intensity over each period of the pattern is summed to produce graph B. As the focal point of the laser beam is moved from being out of focus to in focus on the working plane, the total intensity for a period of the pattern reduces as a thickness of the line reduces. Fitting a curve to the summed intensities can be used to correct control of the focusing optics 1106b of the scanner 1106.

A fixture 1400 for mounting the calibration artefact 1350 and aluminium plate 1250 is shown in Figures 19 and 20. The fixture comprises a support 1401 for supporting the calibration artefact/aluminium plate and wings 1402, 1403 for mounting the support 1401 in place in the build chamber 1117. The wings 1402, 1403 are offset relative to a supporting surface of the support 1401 such that the wings 1402, 1403 are located above and to the side of the support 1401 when the fixture 1400 is located in the additive manufacturing apparatus. The wings 1402, 1403 comprise handles 1404, 1405 for manipulation of the fixture 1400 and mounting elements 1406, 1407 and 1408 for kinematically locating a calibration artefact/aluminium plate supported by the fixture 1400 in a repeatable vertical position in the build chamber 1117. In this embodiment, the elements 1406, 1407 and 1408 comprise three balls that provide point surfaces for contacting surface 1115a at three spaced apart positions.

The fixture 1400 comprises two further positioning elements 1409 and 1410 for locating the support 1401 in a fixed position in the x and y directions. The elements 1409 and 1410 each comprise a ball mounted in a recess in the support 1401 and biased outwardly from the support 1401 by springs (not shown) such that, upon insertion of the support into the build chamber 1117, the balls engage a wall of the build chamber 1117 and are deflected against the biasing of the springs, the biasing holding the fixture 1400 in place.

Both the calibration artefact 1350 and aluminium plate 1250 have a suitable shape for mounting on support 1401.

The method may further comprise aligning a lower edge of the wiper 1109 with surface 1115a that is used for alignment of the fixture 1400, and therefore, the calibration artefact 1350, such that the wiper 1109 forms powder layers in the working plane 1110. Alignment of the wiper 1109 with the surface 1115a may be carried out using known methods. Using the same datum for alignment of the wiper 1109 and positioning of the calibration artefact 1350 ensures that the powder layer is aligned with the working plane for which the scanner 1106 is calibrated. Choosing a fixed surface 1115a for the datum rather than a movable surface, such as the build platform 1102, ensures that errors in alignment do not arise from lack of repeatability/inaccuracy in the positioning of the movable surface, such as the build platform 1102.

An absolute position of an x, y coordinate system of the scanner 1106 in the x- and y- directions relative to the build volume defined by build chamber 1117 may be unknown because a position of the reference pattern 1351 in the x- and y-direction may be unknown. However, the method calibrates the scanner 1106 to correct for distortions in a coordinate system of the scanner 1106. Accordingly, the above calibration method calibrates the scanner 1106 based upon a position of the reference pattern 1351 in the additive manufacturing apparatus.

The calibration method as described above could be used to calibrate each scanner in a multi-laser additive manufacturing apparatus. Each scanner could be used to mark patterns on one or more test plates and the phase shifts in the patterns formed by each scanner relative to the reference pattern used to calibrate the scanner.

A position of the coordinate system of the scanner 1106 may not be known with sufficient accuracy if the additive built workpiece is to be aligned with non-additively built features, for example on substrate 1501. For example, it is known to build hybrid additive parts in which a first portion of the part comprises a preformed substrate and a second portion of the part is additively built. On example of such a hybrid additive part is a mould insert in which cooling liquid channels are machined into the substrate prior to building the remainder of the mould insert using an additive process. The mould insert is formed with conformal cooling channels that connect with the cooling liquid channels in the substrate. Such a workpiece is described in US7261550.

In processes, wherein a substrate on which an additively built workpiece is built is premachined with features to be aligned with the additively built workpiece, it is important that a position of the machined features in a coordinate system of the scanner 1106 are known such that the desired alignment can be achieved.

In accordance with an embodiment of the invention as shown in Figure 21, the method of forming a hybrid workpiece may comprise locating a build substrate 1501 that is to form part of the hybrid workpiece, but without the preformed features, on the build platform 1102 of the additive manufacturing apparatus. The build substrate 1501 and build platform 1102 may comprise mounting formations for kinematically locating the build substrate 1501 in a repeatable position on the build platform 1102, for example as described in WO2015/092442.

The laser 1105 and calibrated scanner 1106 are controlled to mark 1502 indicia 1507 on the build substrate 1501 that can be used to identify locations on the build substrate 1501 in which features 1506 are to be preformed. For example, in the case of preformed cooling channels, the locations of openings of the channels in a top surface of the build substrate 1501 may be marked 1507a. In a further embodiment, rather than marking the build substrate 1501 with indicia 1507a corresponding to a shape of a feature to be formed, indicia 1507b may be formed that can be identified by a machine tool used to form the features 1506 and used to align a coordinate system of the machine tool 1510 with a coordinate system of the scanner 1106. The indicia 1507b may be selected for the ease of recognition and determination of position using a camera 1591. For example, the indicia 1507b may comprise a pattern similar to that described with reference to Figure 14, wherein a position of the pattern is resolved by determining a phase of the pattern formed on the build substrate 1501 with the laser beam 1118.

The build substrate 1501 is then removed from the additive manufacturing apparatus and mounted on a machine tool 1510 for formation of the features 1506. The features 1506 are formed 1503 by the machine tool at a location in the build substrate 1501 based upon the location of the indicia 1507 on the build substrate 1501. For example, a location of the indicia on the build substrate 1510 may be identified using camera 1591, such as a video probe or the like, mounted in the machine tool 1510. The position of the indicia 1507 relative to the features 1506 to be machined is known and the machine tool 1510 can adjust its coordinate system or machine tool instructions to align the formation of the features to the indicia. In this example, the features 1506 are channels formed in the substrate 1501.

The substrate 1501 is then remounted on the build platform 1102, the kinematic mounting elements ensuring that the build substrate 1501 is mounted in the same position as the position it was in when marked with the indicia 1507. The additively built portion 1505 of the hybrid workpiece is then built 1504 using the additive manufacturing apparatus. Alignment of the preformed features 1506 with the additively built portion 1505 is ensured as a result of the indicia being formed by the calibrated scanner 1106 used to form the subsequent additively built portion 1505.

It will be understood that modification and alterations to the above described embodiments may be made without departing from the scope of the invention as defined herein. For example, the pattern may not comprise separate regions 1203a, 1203b from which correction data (a phase) for the x- and y-directions is calculated but may comprise a single region from which periodic components can be calculated for both perpendicular directions.

ANNEX 2

GB 1607152.4

MEASUREMENTS IN ADDITIVE MANUFACTURING APPARATUS

Field of Invention

This invention concerns a method and apparatus for carrying out measurements in an additive manufacturing apparatus comprising multiple scanners, each scanner for directing a radiation beam to a working plane. In particular, but not exclusively, the invention concerns a method for calibrating scanners of an additive manufacturing apparatus comprising a material bed (e.g. powder or resin bed).

Background

Additive manufacturing or rapid prototyping methods for producing parts comprise layer-by-layer solidification of a material. There are various additive manufacturing methods, including powder bed systems, such as selective laser melting (SLM), selective laser sintering (SLS), electron beam melting (eBeam), resin bath based systems, such as stereolithography, and non-powder bed systems, such as fused deposition modelling, including wire arc additive manufacturing (WAAM).

In selective laser melting, a powder layer is deposited on a powder bed in a build chamber and a laser beam is scanned across portions of the powder layer that correspond to a cross-section (slice) of the workpiece being constructed. The laser beam melts or sinters the powder to form a solidified layer. After selective solidification of a layer, the powder bed is lowered by a thickness of the newly solidified layer and a further layer of powder is spread over the surface and solidified, as required.

To form a workpiece accurately the scanner has to be calibrated.

WO94/15265 discloses placing a Mylar sheet with a large number of square cells printed thereon on a target surface and marking each cell with the laser beam. The sheet is then converted into digital form by scanning with a conventional digital scanner and the location of the laser mark relative to the centroid of the cell is used to update the correction factors for that cell. Such a calibration is carried out periodically.

US5832415 discloses a method for calibrating the deflection control of a laser beam for a rapid prototyping system. A light-sensitive medium is exposed to a laser beam at predetermined positions for generating a test pattern. A video camera is progressively moved across the produced test pattern so as to produce corresponding pattern portions of the test pattern with the camera. An evaluation program is used for composing the digitized pattern portions to an overall pattern. The picture coordinates of the overall pattern are compared with the digitized coordinates of a photomechanically produced reference pattern. A correction table required for control of the scanner for deflecting the laser beam is modified on the basis of the comparison.

US6483596 discloses a method for calibrating the control of a radiation device in a rapid prototyping system, wherein a calibration plate is arranged at a defined position in the rapid prototyping system. The calibration plate has an upper side with a first region and second region separate from the first region. The first region is provided with optically detectable reference crosses and the second region has a medium which is sensitive to the radiation of the radiation device. A test pattern of crosses is produced by exposing the medium to the radiation at predetermined desired positions defined by position coordinate data. The first and second regions are digitised, for example by means of a pixel scanner, a video camera or a digital camera, and correction data is calculated from comparing the reference crosses and crosses of the test pattern.

EP2186625 discloses a method to correct for geometric distortion of digital light projectors used in a rapid prototyping system. A camera is used to view an uncompensated test pattern created by each digital light projector. Each uncompensated test pattern is compared with the ideal test pattern to generate a pattern correction map.

WO2014/180971 discloses a method of automatic calibration of a device for generative production of a three-dimensional workpiece comprising first and second scanners. On an applied layer of material or a target, a first test pattern is produced using the first scanner and a second test pattern is produced using the second scanner. The first and second test patterns may be a specific grating pattern with a specific lattice constant or a dot pattern. A calibrated camera is used to capture an image of the first and second test patterns and compare the first and second test patterns to a reference pattern stored in memory of a control device. The first and second scanners are calibrated such that deviations of the corresponding test patterns from the reference pattern fall below a desired value. The calibration method may comprise an auto-correlation method or matching method.

It is desirable to provide a method of calibrating scanners of a multi-beam additive manufacturing apparatus in an automated manner. It is desirable to provide a method for calibrating the scanners for thermal drift that may occur during the build.

Summary of Invention

According to a thirteenth aspect of the invention there is provided a method for determining an attribute of an additive manufacturing apparatus comprising a plurality of scanners, each scanner of the plurality of scanners comprising beam steering optics for directing a corresponding radiation beam to a working plane in which material is consolidated in layers, the method comprising controlling the beam steering optics of a pair of the scanners such that a first scanner of the pair directs a radiation beam to form a feature in the working plane and the feature is within a field of view of a detector of the second scanner of the pair, the detector for detecting radiation coming from the working plane that is collected by the beam steering optics of the second scanner, recording at least one detector value with the detector of the second scanner for the field of view and determining an attribute of the additive manufacturing apparatus from a comparison of the detector value with an expected detector value as determined from a positioning of the steering optics of the first scanner of the pair when forming the feature.

The feature may be a radiation profile, such as laser spot, or a melt pool formed by the radiation beam in the working plane. The feature may be a feature formed by ablating material of a surface in the working plane or consolidating material at the working plane using the radiation beam. The feature may be a reference pattern formed on a surface in the working plane within the field of view using the radiation beam directed by the first scanner. The radiation beam may be structured light directed onto a surface in the working plane by the first scanner.

According to a fourteenth aspect of the invention there is provided a method for determining an attribute of an additive manufacturing apparatus comprising a plurality of scanners, each scanner comprising beam steering optics for directing a corresponding radiation beam to a working plane in which material is consolidated in layers and a detector for detecting radiation coming from the working plane that is collected by the beam steering optics, the method comprising controlling the beam steering optics of first and second scanners of a pair of the scanners such that fields of view of the working plane for the detectors of the first and second scanners at least overlap, and preferably are nominally coterminous, recording at least one detector value with the detector of each of the first and second scanners for the corresponding field of view and determining an attribute of the additive manufacturing apparatus from a comparison of the detector values recorded by the first and second scanners.

The method of the fourteenth aspect may comprise: recording detector values when a radiation beam is directed onto material in the working plane within the fields of view by one of the plurality of scanners and/or recording detector values generated by a feature, such as a reference pattern, located in the working plane in the fields of view.

The feature may be formed on a surface in the working plane using one of the radiation beams. The feature may be formed by ablating material and/or consolidating material in the working plane. The feature may be formed by the projection of detectable radiation, such as a structured light pattern on to material in the working plane. The projection of detectable radiation may comprise a first structured light pattern of a first wavelength in a first orientation and a second structured light pattern of a second, different wavelength oriented in a second, different direction. The first and second scanners may comprise a detector capable of detecting both the first wavelength and second wavelength of light.

The method may comprise placing a reference artefact comprising the reference pattern in the additive manufacturing apparatus such that the reference pattern is located in the working plane within the fields of view.

In this way, an attribute of the additive manufacturing apparatus can be determined by cross-referencing data from the two scanners of the pair. For example, the data may be cross-referenced to calibrate one of the scanners relative to the other scanner. The attribute may be an attribute of the scanners, such as a difference in a measured position or size of: a spot of the radiation beam, a feature formed by the radiation beam and/or field(s) of view in the working plane as determined from the detector value(s) from a nominal value. Alternatively, the data may be cross-referenced, for example using triangulation, to determine an attribute of material/a surface in the working plane, such as a height/position of solidified or unsolidified material in the field of view, a location of a build substrate/build platform or a location of a preformed part to be built on using the additive manufacturing process.

The method may comprise adjusting the additive manufacturing apparatus to correct for a difference in the attribute from the nominal value. For example, a correction value, function or map may be determined for correcting at least one position of the steering optics of one of the scanners of the pair based upon the difference in the attribute from the nominal value. The correction value, function or map may be based upon a measured position in the working plane of the radiation beam or a feature generated by the radiation beam, as derived from the detector value, relative to a nominal position. The correction value, function or map may be based upon a measured relative position of the fields of view, as derived from the detector values, compared to a nominal position.

The additive manufacturing apparatus may comprise more than two scanners and the method comprises carrying out the method for multiple pairs of the more than two scanners to generate a correction value, function or map for one of the scanners of each pair such that the more than two scanners are aligned to a common frame of reference.

The method may comprise calibrating the steering optics of a first one of the plurality of scanners to provide a first calibrated scanner and generating the correction value, function or map for one or more of the other scanners of the plurality of scanners (in a method described above) to align positioning of the steering optics of the one or more scanners with the first calibrated scanner. The first calibrated scanner may be calibrated using a different method, for example using the method described in unpublished GB patent application no: 1604728.4, which is incorporated herein by reference.

The detector may comprise a position sensitive device (PSD) that can measure a variation in intensity of the radiation across the field of view in one or, preferably, two dimensions. The PSD may comprise an isotropic sensor or a two-dimensional array of discrete elements sensitive to the radiation, such as a charge coupled device (CCD) or complementary metal–oxide–semiconductor device (CMOS). The comparison may comprise a comparison of a radiation intensity across the PSD of the second scanner to an expected position or a radiation intensity across the PSD of the first scanner.

The method may comprise directing the radiation beam with the first scanner of the pair across material in the working plane to form a melt pool, determining from the detector value on the PSD of the second scanner a position of the melt pool in a field of view of the second scanner and generating the correction value, function or map for the first or second scanner based upon the position of the melt pool in the field of view. The melt pool provides a distinctive feature that can be easily distinguished from the surrounding unmelted material and emits radiation of a different wavelength from the wavelength of light of the radiation beam. Accordingly, a filter can be used to separate the radiation emitted from the melt pool from back-reflected light of the radiation beam such that the back-reflected light is not incident on the detector. Use of the melt pool as a feature on which to base a correction of the scanner may allow correction of the scanner during the build, for example, to correct for drifting in the position of a radiation beam directed by the scanner due to thermal effects as the temperature of the scanner changes. At the start of a build a scanner may be relatively cool but may heat up as a radiation beam, such as a high power laser beam, is passed therethrough to melt material in the working plane.

The method may comprise determining from the detector value on the PSD of the second scanner a position of the feature in a field of view of the second scanner and generating the correction value, function or map for the first or second scanner based upon the position of the feature in the field of view.

The reference pattern may comprise at least one periodic feature, capturing an image of the reference pattern with the detector of the second scanner, the method comprising determining from the image a measured periodic property of the reference pattern and determining the correction value, function or map for control of the first or second scanner based upon a comparison of the measured periodic property with a reference periodic property. The reference periodic property may be determined from the instructions used to drive the other scanner of the pair when forming the reference pattern or an image of the reference pattern captured by the detector of the other scanner of the pair.

By basing the correction on the periodic property of the reference pattern more accurate correction data can be determined. In particular, the periodic property may be determined with more accuracy than a position of a geometric feature or melt pool because the periodic property is based upon information determined from multiple geometric features (e.g. information averaged across multiple ones of the geometric features) rather than being dependent on a resolution of a single one of the geometric features on the detector.

The periodic property may be a measured phase shift of the reference pattern relative to a reference phase or a phase measured from the detector of the other scanner of the pair. A phase of the reference pattern may by indicative of an error in position of the radiation beam when forming the reference pattern and/or an error in positioning the field of view and the correction value, function or map may be determined from the phase shift to correct the positioning of the steering optics of the first or second scanner.

The phase shift may be determined through Fourier analysis of the image. The phase shift may be determined by carrying out a discrete Fourier transform of the image of the reference pattern at a reference frequency and determining the phase shift of a resultant frequency component from the reference phase. A value for the phase shift may be determined for each of a plurality of different positions of the field of view relative to the reference pattern.

The reference pattern may comprise a first pattern comprising a first geometric feature repeated in a first direction and a second pattern comprising a second geometric feature repeated in a second direction, perpendicular to the first direction. The first and second geometric features may be the same (but rotated to the corresponding first and second direction) or different. Each of the first and second directions may correspond to a spatial direction in which the radiation beam is moved by a different steering optics of the scanner. The first pattern and second pattern may be interspersed without overlap between the geometric features of each pattern.

The reference pattern may comprise a series of parallel lines. The reference pattern may comprise at least one first set of parallel lines that repeat in the first direction and at least one second set of parallel lines that repeat in the second direction. First sets of parallel lines may alternate with parallel lines of the second set across the working plane in both the first and second directions.

According to a fifteenth aspect of the invention there is provided a controller for controlling an additive manufacturing apparatus, wherein the controller is arranged to carry out the method of the thirteenth or fourteenth aspects of the invention.

According to a sixteenth aspect of the invention there is provided an additive manufacturing apparatus for building up a workpiece in a layer-by-layer manner comprising a plurality of scanners, each scanner for directing a radiation beam to consolidate material in a working plane and a controller according to the fifthteenth aspect of the invention.

According to a seventeenth aspect of the invention there is provided a data carrier having instructions thereon, which, when executed by a controller for controlling an additive manufacturing apparatus, cause the controller to carry out the method of the thirteenth or fourteenth aspect of the invention.

The data carrier may be a suitable medium for providing a machine with instructions such as non-transient data carrier, for example a floppy disk, a CD ROM, a DVD ROM / RAM (including - R/-RW and +R/ + RW), an HD DVD, a Blu Ray(TM) disc, a memory (such as a Memory Stick(TM), an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

According to an eighteenth aspect of the invention there is provided a method for determining an attribute of an additive manufacturing apparatus comprising a plurality of scanners, each scanner of the plurality of scanners comprising positioning elements for directing an energy source to a working surface to consolidate material thereon, the method comprising controlling the positioning elements of a pair of the scanners such that a first scanner of the pair directs the corresponding energy source onto the working surface within a field of view of a detector of a second scanner of the pair, the detector for detecting radiation coming from the working surface and arranged to be positioned relative to the working surface using the positioning elements of the second scanner that are used to position the energy source, recording at least one detector value with the detector of the second scanner for the field of view and determining an attribute of the additive manufacturing apparatus from a comparison of the detector value with an expected detector value as determined from a positioning of the energy source by the first scanner of the pair.

The energy source may be a plasma arc and the scanner a deposition head of a wire-arc additive manufacturing apparatus. The positioning elements may comprise a robot or gantry system for positioning the deposition head relative to the working surface.

According to a nineteenth aspect of the invention there is provided a controller for controlling an additive manufacturing apparatus, wherein the controller is arranged to carry out the method of the eighteenth aspect of the invention.

According to a twentieth aspect of the invention there is provided an additive manufacturing apparatus for building up a workpiece in a layer-by-layer manner comprising a plurality of scanners, each scanner for directing an energy source to consolidate material on a working surface and a controller according to the nineteenth aspect of the invention.

According to a twenty-first aspect of the invention there is provided a data carrier having instructions thereon, which, when executed by a controller for controlling an additive manufacturing apparatus, cause the controller to carry out the method of the eighteenth aspect of the invention.

Description of the Drawings

Figure 22:
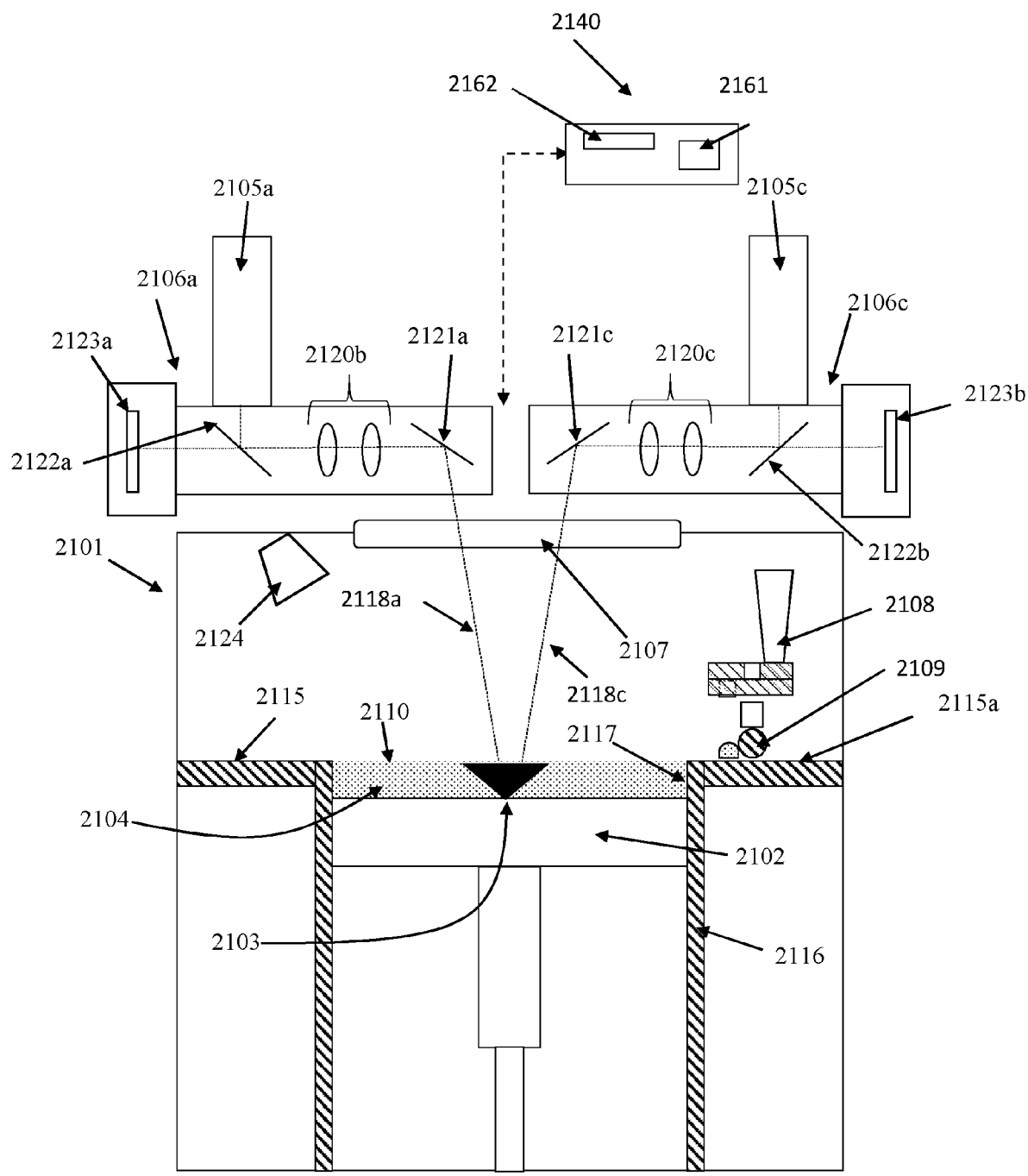
Figure 23:
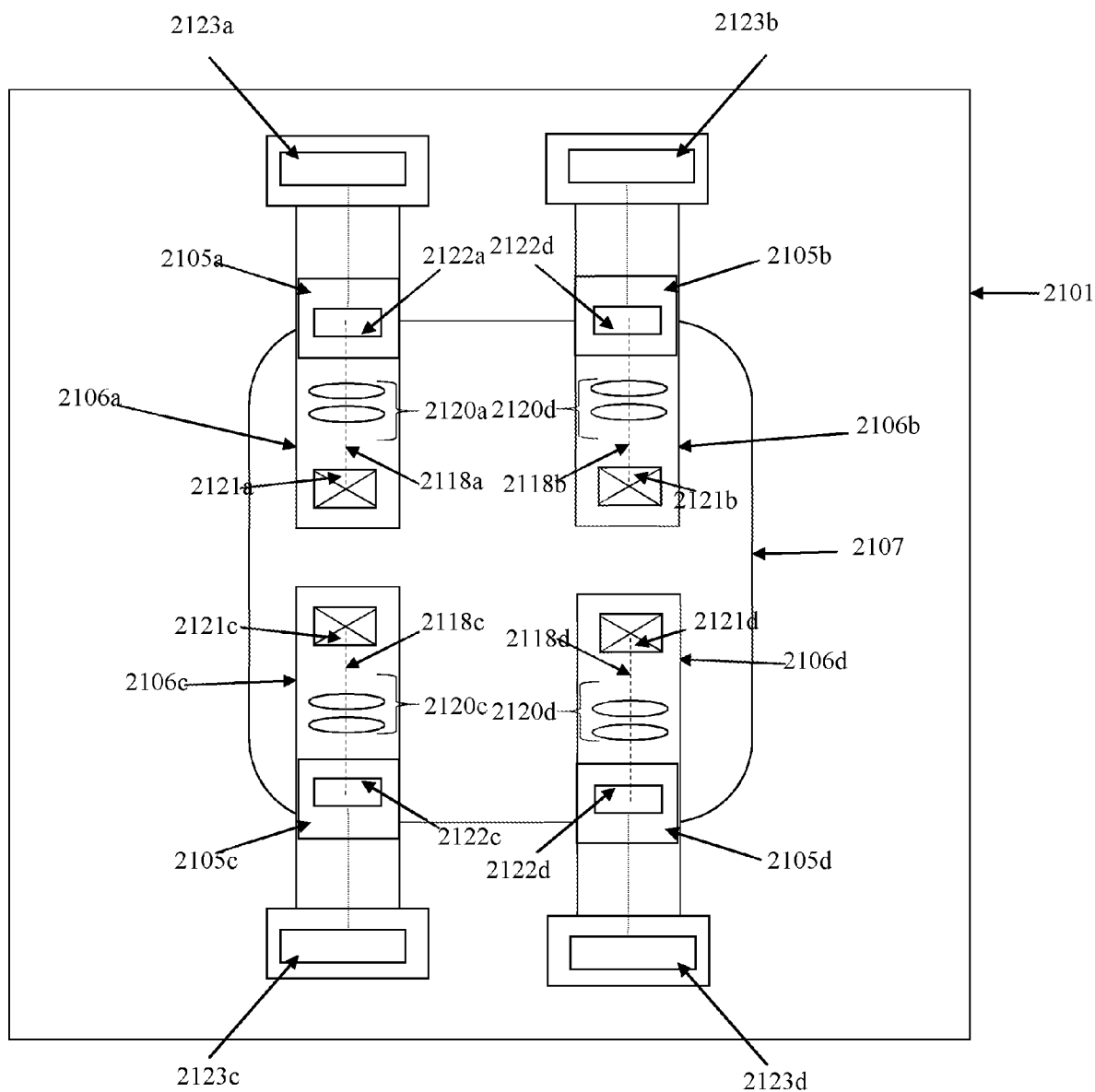
Figure 24:
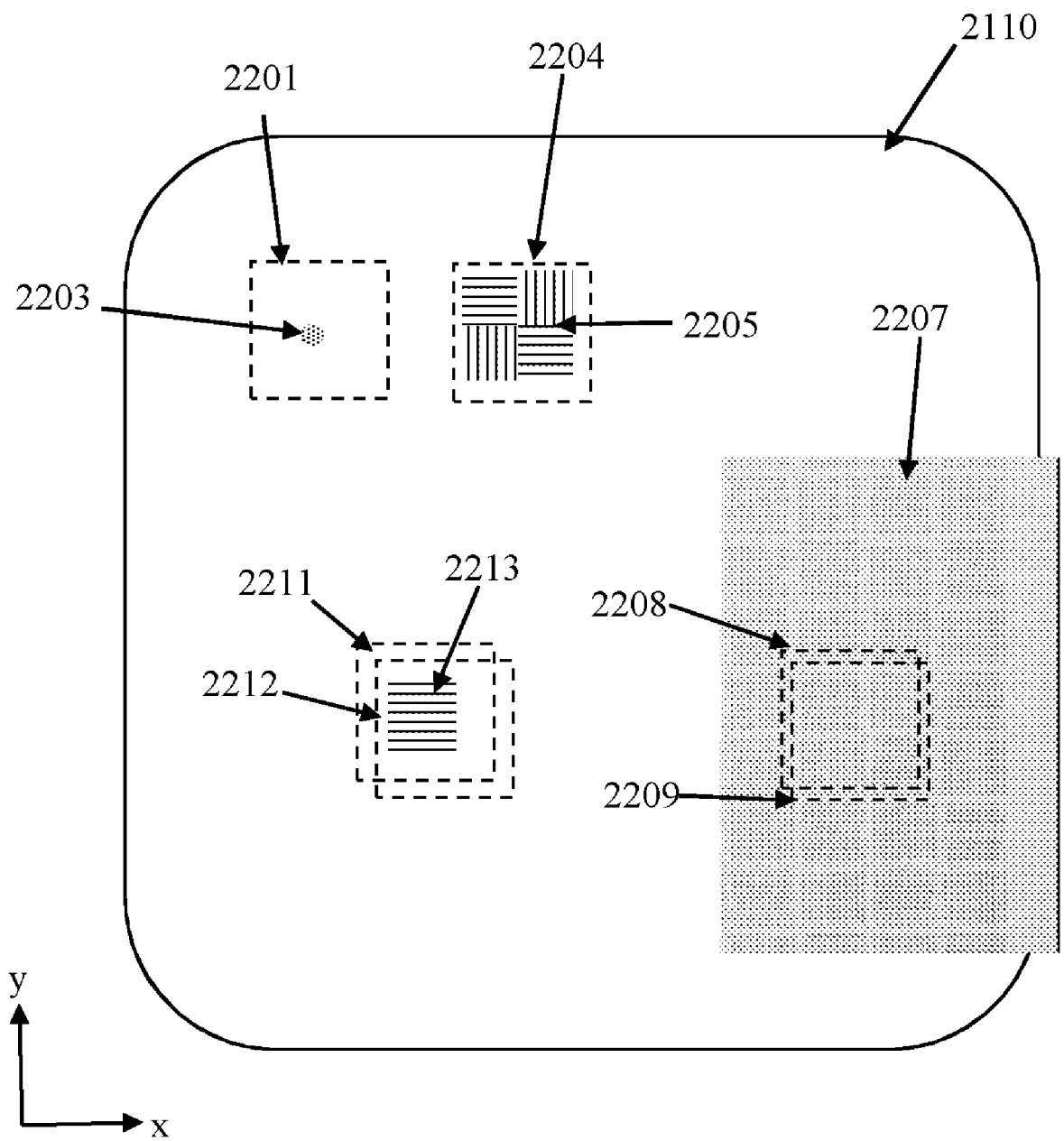
Figure 25:
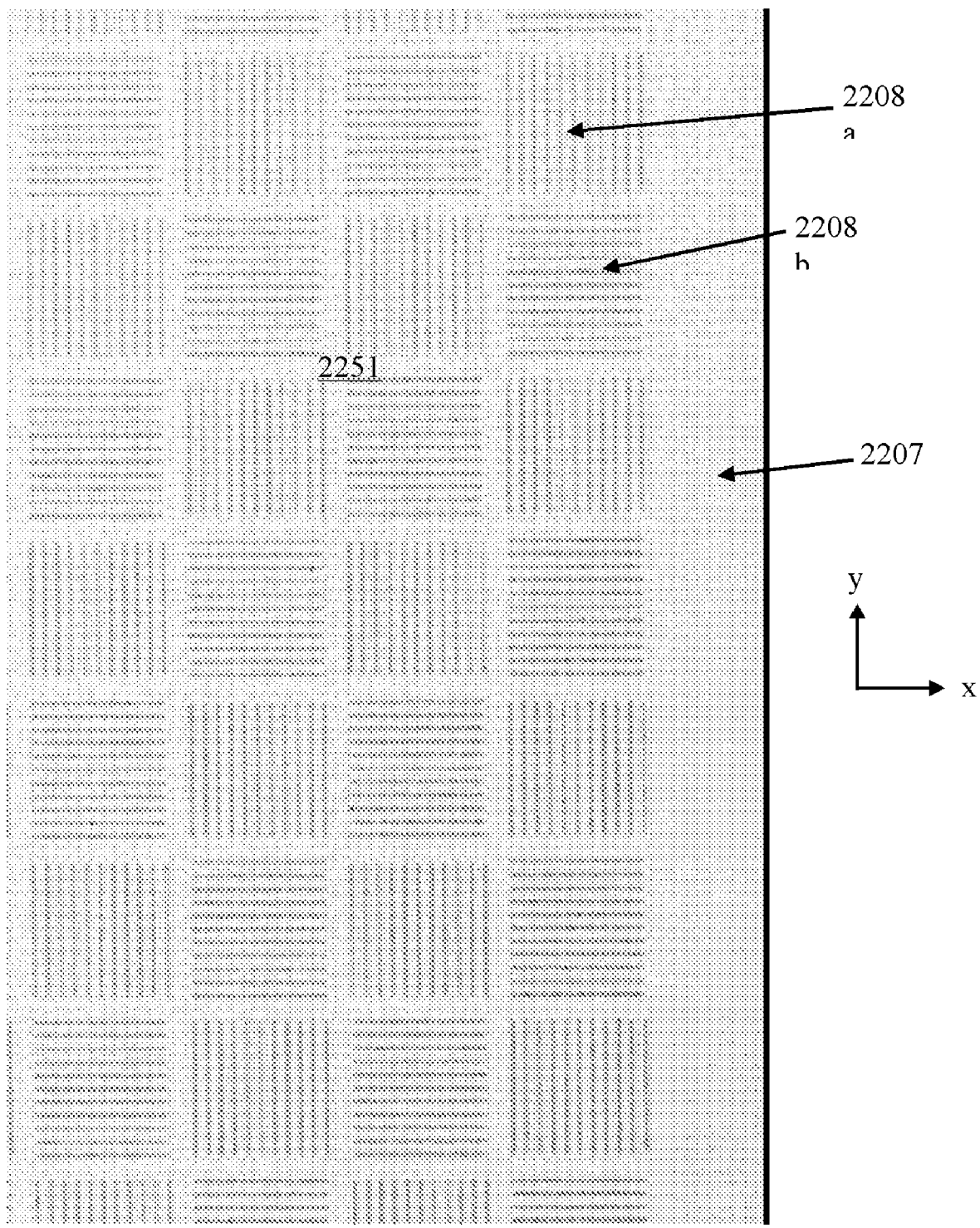

>Figure 22 shows an additive manufacturing apparatus according to an embodiment of the invention;

>Figure 23 is a plan view of the additive manufacturing apparatus shown in Figure 22;

Figure 24 shows embodiments for capturing data relating to a pair of scanners of the additive manufacturing apparatus according to the invention;

Figure 25 is a reference pattern according to an embodiment of the invention for calibrating steering optics of the scanners; and

Figure 26:
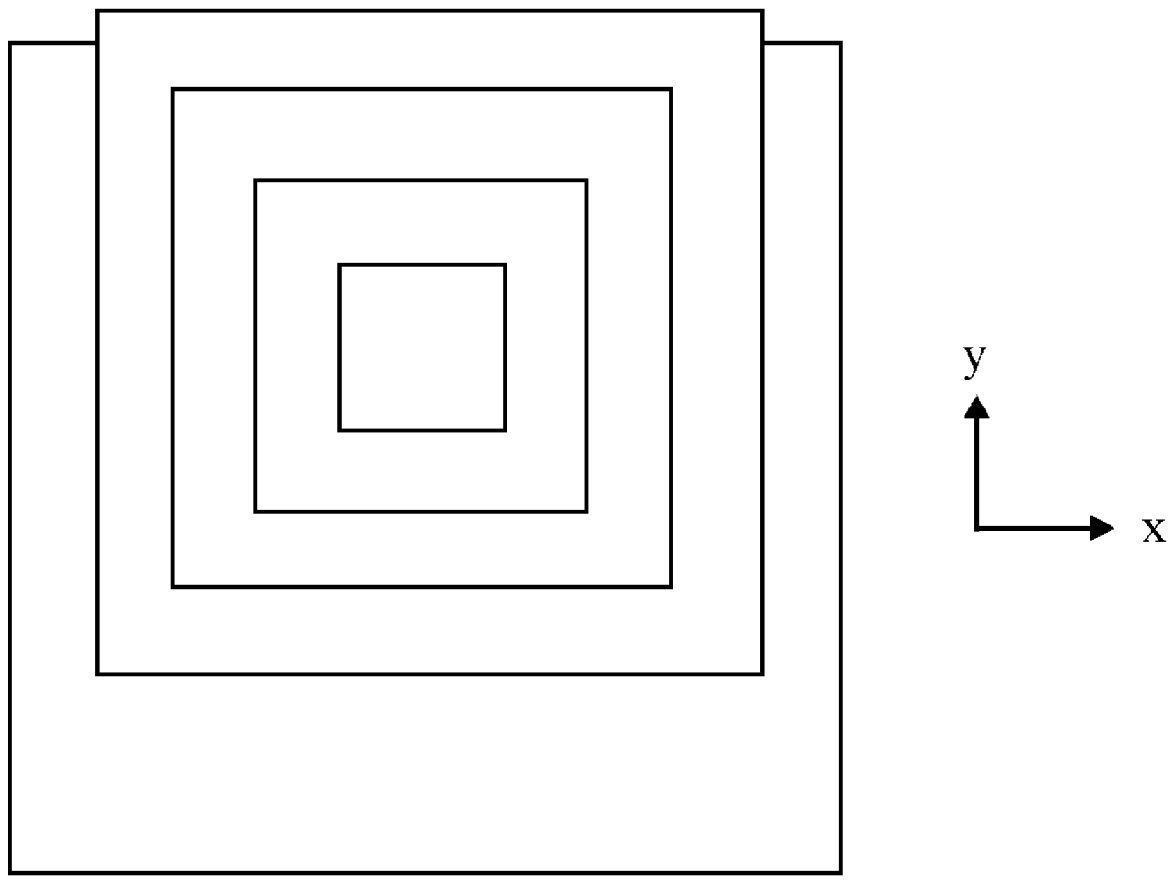

Figure 26 is a reference pattern according to another embodiment of the invention.

Description of Embodiments

Referring to Figures 22 and 23, an additive manufacturing apparatus according to an embodiment of the invention comprises a build chamber 2101 having therein partitions 2115, 2116 that define a build volume 2117. A build platform 2102 is lowerable in the build volume 2117. The build platform 2102 supports a powder bed 2104 and workpiece 2103 as the workpiece is built by selective laser melting of the powder. The platform 2102 is lowered within the build volume 2117 under the control of a motor as successive layers of the workpiece 2103 are formed.

Layers of powder 2104 are formed as the workpiece 2103 is built by dispensing apparatus 2108 and a wiper 2109. For example, the dispensing apparatus 2108 may be apparatus as described in WO2010/007396. The dispensing apparatus 2108 dispenses powder onto an upper surface 2115a defined by partition 2115 and is spread across the powder bed by wiper 2109. A position of a lower edge of the wiper 2109 defines a working plane 2110 at which powder is consolidated.

A plurality of laser modules 2105a, 2105b, 2105c and 2105d generate laser beams 2118a, 2118b, 2118c, 2118d for melting the powder 2104, the laser beams 2118a, 2118b, 2118c, 2188d directed as required by a corresponding optical module 2106a, 2106b, 2106c, 2106d. The laser beams 2118a, 2118b, 2118c, 2118d enter through a common laser window 2107. Each optical module comprises steering optics 2121, such a two mirrors mounted on galvanometers, for steering the laser beam 2118 in perpendicular directions across the working plane and focussing optics 2120, such as two movable lenses for changing the focus of the laser beam 2118. The scanner is controlled such that the focal position of the laser beam 2118 remains in the same plane as the laser beam 2118 is moved across the working plane. Rather than maintaining the focal position of the laser beam in a plane using dynamic focusing elements, an f-theta lens may be used.

Each optical module 2106a, 2106b, 2106c, 2106d comprises a beam splitter 2122 which reflects the laser beam 2118 and transmits wavelengths of radiation coming from the working plane of the powder bed 2104. The beam splitter 2122 may be arranged to transmit wavelengths that differ from a wavelength of the laser beam. The radiation that passes through the beam splitter 2122 is imaged by a detector 2123 in the form of a two-dimensional array of photodetector elements. The optical system may comprise further filters for filtering out wavelengths that are not of interest before the radiation is incident on the detector 2123. For example, only visible light may be of interest or light in the infrared spectrum that arises from thermal emissions from the bed 2104/melt pool.

Suitable lighting (not shown) may be provided for illuminating the working plane 2110 of the powder bed 2104.

A controller 2140, comprising processor 2161 and memory 2162, is in communication with modules of the additive manufacturing apparatus, namely the laser modules 2105a, 2105b, 2105c, 2105d, optical modules 2106a, 2106b, 2160c, 2106d, build platform 2102, dispensing apparatus 2108, wiper 2109 and detectors 2123a, 2123b, 2123c, 2123d. The controller 2140 controls the modules based upon software stored in memory 2162 as described below.

Referring to Figures 24 and 25, a first one of the optical modules 2106 may be calibrated using known methods or, for example, the method as described in GB1604728.4, which is incorporated herein by reference. Calibration of the remaining plurality of optical modules 2106 is then carried out through comparison against the optical module 2106 that has already been calibrated. Figure 24 illustrates four ways in which this may be done.

In the first method, a calibrated one of the optical modules 106 directs its corresponding laser beam 2118 to a defined x,y position on the working plane 2110 to form a melt pool 2203. At least one, and possibly all, of the uncalibrated optical modules 2106 is/are directed to the same position. In this way, the melt pool 2202 is within a field of view 2201 of the or each detector 2123 of the uncalibrated module(s). As the calibrated and uncalibrated optical modules are nominally directed to the same position, if the optical modules 2106 were aligned, the melt pool 2202 should appear in the centre of the field of view. However, if there is a misalignment between the optical modules 2106, the melt pool 2202 may appear off-centre.

An image of the melt pool 2202 is captured on the detector 2123 of the or each uncalibrated optical module 2106 and a representative signal is sent to controller 2140. The controller 2140 determines a location of the centre of the melt pool 2202 on the two-dimensional array of the detector 2123 and determines a correction value to correct for misalignment of the calibrated and uncalibrated optical modules 2106. This process may be repeated for multiple locations across the working plane 2110 to build up a correction map or determine a correction function from which corrections in positions of the steering optics 2121 for different positions of the laser beam 2118 on the working plane 2110 can be determined. The process may be carried out before and/or during a build. In particular, the relative positional accuracy of the optical modules 2106 may drift during the build because of the heating (possibly differential heating) of the optical modules 2106. Adjustments made during the build can correct for this thermal drift during the build.

In a further embodiment, the calibrated optical module 2106 is used to form a feature on the working plane 2110, for example by ablating the surface of a substrate in the working plane or building the substrate by solidifying powder. In this embodiment, the feature comprises a reference pattern 2205 comprising multiple squares of equally spaced parallel lines, some of the squares having lines spaced in the x-direction and the other ones of the squares having lines spaced in the y-direction. The uncalibrated optical module 2106 is located such that a field of view 2204 encompasses the reference pattern 2204 and is nominally centred at the centre of the reference pattern 2205. The image of the reference pattern 2205 as recorded on the detector 2123 of the uncalibrated optical module 2106 and is used to determine an actual position of the field of view relative to the nominal position. A correction value is determined for the uncalibrated optical module 2106 based upon the difference between the actual and nominal position and, as before, a correction map or function may be determined based upon correction values determined for multiple locations on the working plane 2110.

The position of the reference pattern in the field of view may be determined by carrying out a discrete Fourier transforms (DFT) of the image of the reference pattern 2205 at a known reference frequency of the parallel lines in the reference pattern 2205. In this embodiment, the DFT is carried out by multiplying the image of the reference pattern recorded on the detector 2123 by digitally generated sine and cosine representations centred at a midpoint of the image from the detector 2123. A phase of the reference pattern in the image is determined for each region of parallel lines. For regions having a pattern with a feature that recurs in the x-direction, a phase shift in the x-direction is determined and, for regions having a pattern with a feature that recurs in the y-direction, a phase shift in the y-direction is determined. The phase shift is determined from the arctan of the quotient of the two values obtained by multiplying the image by the sine and cosine representations.

The phase shifts in x and y provide correction values for aligning the uncalibrated optical module with the calibrated optical module.

Figure 26 shows an alternative reference pattern, comprising interconnected periodic features in both x and y.

In a further embodiment, a reference artefact 2207 having a reference pattern thereon is placed in the additive manufacturing apparatus to locate the reference pattern in the working plane 2110. The reference pattern comprising multiple regions, in this embodiment squares 2208a, 2208b, of equally spaced parallel lines, some of the squares 2208a having lines spaced in the x-direction and the other ones of the squares 2208b having lines spaced in the y-direction. The calibrated optical module 2106 and an uncalibrated optical module 2106 are driven to nominally the same location on the working plane 2110, which includes the reference pattern. In doing so, the fields of view 2208, 2209 of the two optical modules 2106 overlap. The images of the reference pattern captured by the detectors 2123 of the optical modules are compared and a correction value is determined for aligning the uncalibrated optical module 2106 with the calibrated optical module 2106. The correction value may be determined by calculating a phase shift of the reference pattern between the two images (for example, calculated in a manner as described above), the correction based upon the calculated phase shift.

In yet another embodiment, a feature, such as a reference pattern 2213, is formed on the working plane 2110 using another one of the optical modules 2106 or another device, such as a device 2124 for projecting a structured light pattern onto the working plane 2110. The calibrated and uncalibrated optical modules 2106 are controlled as before to move to nominally the same location on the working plane 2110 such that the fields of view 2211, 2212 include the feature/reference pattern and the images captured by the detectors 2123 are compared to determine a phase shift of the reference pattern 2213 between the two images from which a correction value is determined for the uncalibrated optical module 2123.

A first reference pattern 2213 may be first be projected on to the working lane 2110 within the fields of view 2211, 2212, the first reference pattern 2213 having features that repeat in a first direction, x, and then a second reference pattern may be projected on to the working lane 2110 within the fields of view 2211, 2212, the second reference pattern 2213 having features that repeat in a second direction, y, perpendicular to the first direction.

Alternatively, the first and second reference patterns may be projected side by side within the fields of view 2211, 2212. In yet another embodiment, the detectors 2123 of the optical modules 2106 are capable of detecting more than one wavelength and the first and second reference patterns are projected onto the same position (or at least overlapping) on the working plane 2110 within the fields of view 2211, 2212 using different wavelength of light. In this way, it is possible to capture information relating to the positioning of the fields of view 2211, 2211 in more than one axis simultaneously In a further embodiment, the feature, such as a reference artefact, may be a permanent feature of the additive manufacturing apparatus.

Rather than the structured light being projected by a separate device 2124, an optical element may be provided in at least one of the optical modules 2106 such that the optical module itself can generate the structured light pattern in the working plane 2110. The laser beam 2118 used to consolidate material may be used to form the structured light pattern or a separate light source may be provided in the optical module 2106.

Once the optical modules 2106a, 2160b, 2106c, 2106d are calibrated, the optical modules may be used to determine a position of a feature on the working plane 2110 through triangulation. For example, a position of a build plate located on the build platform 2102 or the build platform 2102 may be measured at multiple locations across the working plane and the build plate/build platform levelled based upon the measured positions. A position of one or more preformed parts to be built on using the additive manufacturing apparatus may be measured using the optical modules and the position(s) adjusted based upon the measurements to the desired orientation. A height of the powder bed may be measured using the calibrated optical modules 2106.

It will be understood that modification and alterations to the above described embodiments may be made without departing from the scope of the invention as defined herein.

The invention claimed is:

1. An additive manufacturing apparatus comprising a build chamber that includes a build chamber window, and a module that includes more than one optical train, each optical train providing a route for a laser beam to pass through the module and comprising steering optics for steering the laser beam towards material to be consolidated as part of a layer-by-layer additive manufacturing process,
wherein the module comprises a single aperture common to the more than one optical train, and the module is configured to deliver laser beams from the more than one optical trains through the single aperture and the build chamber window, and wherein the build chamber window comprises a single window comprising optically transparent material.

2. The additive manufacturing apparatus of claim 1, wherein the more than one optical train of the module includes (i) a first optical train providing a first route for a first laser beam to pass through the module and comprising first steering optics for steering the first laser beam towards the material to be consolidated as part of the layer-by-layer additive manufacturing process, and (ii) a second optical train providing a second route for a second laser beam to pass through the module and comprising second steering optics for steering the second laser beam towards the material to be consolidated as part of the layer-by-layer additive manufacturing process.

3. The additive manufacturing apparatus of claim 2, the module comprising a fixing point or points for attaching the module to the build chamber of the additive manufacturing apparatus so the module bridges the build chamber window.

4. The additive manufacturing apparatus of claim 2, the module comprising a single aperture common to the more than one optical train.

5. The additive manufacturing apparatus of claim 2, further comprising a common thermal circuit thermally connecting each of the more than one optical trains, and wherein the common thermal circuit is a cooling circuit comprising cooling channels.

6. The additive manufacturing apparatus of claim 5, the module comprising a single aperture common to the more than one optical train wherein the cooling circuit cools the module in a vicinity of the single aperture common to the more than one optical trains.

7. The additive manufacturing apparatus of claim 2 wherein each of the first and second optical trains defines an irradiation volume of its laser beam in use, and wherein an irradiation volume overlap of the first and second optical trains encompasses at least part of the build chamber window.

8. The additive manufacturing apparatus of claim 2 wherein the module comprises an additively built housing.

9. An additive manufacturing apparatus comprising the module of claim 2 further comprising a plurality of modules arranged as an array.

10. The additive manufacturing apparatus as claimed in claim 9 wherein the array is a one-dimensional array.

11. The additive manufacturing machine as claimed in claim 10 wherein the plurality of modules of the array are elongate modules and arranged together along a minor axis.

12. The additive manufacturing machine as claimed in claim 1 wherein the module is movable along a linear axis.

13. The additive manufacturing apparatus as claimed in claim 9 wherein the array is a two-dimensional array.

14. The additive manufacturing apparatus as claimed in claim 13 wherein the two-dimensional array comprises more than two modules in a first direction.

15. The additive manufacturing apparatus as claimed in claim 14 wherein the two-dimensional array comprises more than two modules in a second direction.

16. The additive manufacturing apparatus according to claim 15 wherein the first and second directions are orthogonal directions.

17. The additive manufacturing apparatus as claimed in claim 1 wherein the module is arranged such that a footprint of the module on a build chamber is not greater than the area which may be irradiated by the module on a working plane.

18. A module for an additive manufacturing apparatus in which material is consolidated as part of a layer-by-layer additive manufacturing process;
the module comprising more than one optical train and a single aperture common to the more than one optical train, each optical train providing a route for a laser beam to pass through the single aperture and be directed towards the material to be consolidated;
wherein the more than one optical trains are provided within a single piece housing.

19. A module as claimed in claim 18 wherein the housing is an additively built housing.

20. A module for an additive manufacturing apparatus comprising:
more than one optical train, each optical train providing a route for a laser beam to pass through the module and comprising steering optics for steering the laser beam towards material to be consolidated as part of a layer-by-layer additive manufacturing process; and
a common thermal circuit that thermally connects each of the more than one optical trains,
wherein the module is configured to deliver laser beams from the more than one optical trains through a single window in a build chamber of the additive manufacturing apparatus.

21. A module for an additive manufacturing apparatus in which material is consolidated as part of a layer-by-layer additive manufacturing process, the module comprising a lower face having an aperture, a module window closing the aperture, and more than one optical train, each optical train providing a route for a laser beam to pass through the module and be directed towards the material to be consolidated,
wherein the laser beams are directed through the aperture and the aperture is a single aperture common to the more than one optical trains provided by the module, and wherein the module is configured to deliver laser beams from the more than one optical train through a single window in a build chamber of the additive manufacturing apparatus.

* * * * *